(12) United States Patent
Han et al.

(10) Patent No.: US 9,205,413 B2
(45) Date of Patent: Dec. 8, 2015

(54) HYDROCONVERSION MULTI-METALLIC CATALYSTS AND METHOD FOR MAKING THEREOF

(71) Applicants: Jinyi Han, San Ramon, CA (US); Alexander E. Kuperman, Orinda, CA (US); Theodorus Ludovicus Michael Maesen, Moraga, CA (US); Horacio Trevino, Richmond, CA (US)

(72) Inventors: Jinyi Han, San Ramon, CA (US); Alexander E. Kuperman, Orinda, CA (US); Theodorus Ludovicus Michael Maesen, Moraga, CA (US); Horacio Trevino, Richmond, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 190 days.

(21) Appl. No.: 14/019,457

(22) Filed: Sep. 5, 2013

(65) Prior Publication Data

US 2014/0066298 A1 Mar. 6, 2014

Related U.S. Application Data

(60) Provisional application No. 61/697,063, filed on Sep. 5, 2012, provisional application No. 61/801,683, filed on Mar. 15, 2013.

(51) Int. Cl.
*B01J 27/051* (2006.01)
*B01J 27/049* (2006.01)
(Continued)

(52) U.S. Cl.
CPC ............ *B01J 27/0515* (2013.01); *B01J 27/043* (2013.01); *B01J 27/047* (2013.01); *B01J 27/049* (2013.01); *B01J 27/051* (2013.01); *B01J 35/002* (2013.01); *B01J 35/1014* (2013.01); *B01J 35/1038* (2013.01)

(58) Field of Classification Search
None
See application file for complete search history.

(56) References Cited

U.S. PATENT DOCUMENTS 1,955,829 A 4/1934 Pier
2,238,851 A 4/1941 Pier
(Continued)

FOREIGN PATENT DOCUMENTS

EP 526988 3/1993
EP 1169414 10/2008
(Continued)

OTHER PUBLICATIONS

Ozkan et al., "Characterization and Activity of Unsupported Ni—Mo Sulfide Catalysts in HDN/HDS Reactions," *Energy & Fuels* 1994, 8, 830-838.
(Continued)

*Primary Examiner* — Melissa Swain

(57) ABSTRACT

The invention relates to a method for preparing a self-supported mixed metal sulfide (MMS) catalyst for hydrotreating hydrocarbon feedstock. The method comprises mixing a sufficient amount of a nickel (Ni) metal precursor, a sufficient amount of a molybdenum (Mo) metal precursor, and a sufficient amount of a tungsten (W) metal precursor to produce a catalyst precursor having a molar ratio Ni:Mo:W in relative proportions defined by a region of a ternary phase diagram showing transition metal elemental composition in terms of nickel, molybdenum, and tungsten mol-%, wherein the region is defined by five points ABCDE and wherein the five points are: A (Ni=0.72, Mo=0.00, W=0.28), B (Ni=0.55, Mo=0.00, W=0.45), C (Ni=0.48, Mo=0.14, W=0.38), D (Ni=0.48, Mo=0.20, W=0.33), E (Ni=0.62, Mo=0.14, W=0.24); and sulfiding the catalyst precursor under conditions sufficient to convert the catalyst precursor into a sulfide catalyst.

19 Claims, 15 Drawing Sheets

(51) Int. Cl.
  *B01J 27/043* (2006.01)
  *B01J 27/047* (2006.01)
  *B01J 35/00* (2006.01)
  *B01J 35/10* (2006.01)

(56) References Cited

U.S. PATENT DOCUMENTS

| | | |
|---|---|---|
| 3,673,079 A | 6/1972 | Mulaskey |
| 3,709,814 A | 1/1973 | Jaffe |
| 3,795,632 A | 3/1974 | Jaffe |
| 4,003,851 A | 1/1977 | Ebel |
| 4,009,096 A | 2/1977 | Pollitzer |
| 4,226,742 A | 10/1980 | Bearden, Jr. |
| 4,298,499 A | 11/1981 | Imai |
| 4,412,859 A | 11/1983 | Hatfield |
| 4,417,972 A | 11/1983 | Francis |
| 4,428,768 A | 1/1984 | Day |
| 4,430,442 A | 2/1984 | Sawyer |
| 4,434,043 A | 2/1984 | Singhal |
| 4,444,655 A | 4/1984 | Shiroto |
| 4,464,477 A | 8/1984 | Buenger |
| 4,508,847 A | 4/1985 | Chianelli |
| 4,511,539 A | 4/1985 | Stephenson |
| 4,540,481 A | 9/1985 | Sawyer |
| 4,542,121 A | 9/1985 | Mitchell |
| 4,556,644 A | 12/1985 | Erpenbach |
| 4,557,760 A | 12/1985 | Erpenbach |
| 4,557,821 A | 12/1985 | Lopez |
| 4,579,728 A | 4/1986 | Schoenthal |
| 4,595,672 A | 6/1986 | Ho |
| 4,637,870 A | 1/1987 | Bearden |
| 4,666,878 A | 5/1987 | Jacobson |
| 4,719,002 A | 1/1988 | Mayer |
| 4,721,558 A | 1/1988 | Jacobson |
| 4,721,606 A | 1/1988 | Tilley |
| 4,722,774 A | 2/1988 | Hyatt |
| 4,740,295 A | 4/1988 | Bearden |
| 4,762,812 A | 8/1988 | Lopez |
| 4,765,882 A | 8/1988 | Aldridge |
| 4,786,752 A | 11/1988 | Holzhauer |
| 4,820,677 A | 4/1989 | Jacobson |
| 4,826,797 A | 5/1989 | Chianelli |
| 4,831,002 A | 5/1989 | Ho |
| 4,836,912 A | 6/1989 | Schlosberg |
| 4,910,175 A | 3/1990 | Michel |
| 4,913,736 A | 4/1990 | Gimzeski |
| 4,976,848 A | 12/1990 | Johnson |
| 5,013,453 A | 5/1991 | Walker |
| 5,026,473 A | 6/1991 | Halbert |
| 5,030,274 A | 7/1991 | Ward |
| 5,037,532 A | 8/1991 | Winter |
| 5,039,392 A | 8/1991 | Bearden |
| 5,053,376 A | 10/1991 | Bearden |
| 5,099,047 A | 3/1992 | Sato |
| 5,122,258 A | 6/1992 | Eadie |
| 5,935,418 A | 8/1999 | Chakrabarty |
| 5,935,421 A | 8/1999 | Brons |
| 5,935,897 A | 8/1999 | Trubenbach |
| 5,977,192 A | 11/1999 | Howsmon |
| 6,030,915 A | 2/2000 | de Boer |
| 6,156,695 A | 12/2000 | Soled |
| 6,162,350 A | 12/2000 | Soled |
| 6,165,934 A | 12/2000 | Gardner |
| 6,171,471 B1 | 1/2001 | Ferrughelli |
| 6,299,760 B1 | 10/2001 | Soled |
| 6,455,018 B1 | 9/2002 | Cuif |
| 6,461,995 B1 | 10/2002 | Addiego |
| 6,531,516 B2 | 3/2003 | Davis |
| 6,534,437 B2 | 3/2003 | Eijsbouts |
| 6,551,378 B2 | 4/2003 | Farone |
| 6,566,296 B2 | 5/2003 | Plantenga |
| 6,620,313 B1 | 9/2003 | Demmin |
| 6,635,599 B1 | 10/2003 | Sonja et al. |
| 6,652,738 B2 | 11/2003 | Eijsbouts |
| 6,712,955 B1 | 3/2004 | Hou |
| 6,758,963 B1 | 7/2004 | Hantzer |
| 6,770,249 B1 | 8/2004 | Hoboy |
| 6,783,663 B1 | 8/2004 | Miseo |
| 6,860,987 B2 | 3/2005 | Plantenga |
| 6,919,066 B2 | 7/2005 | Hölzle |
| 7,183,005 B2 | 2/2007 | Poloso |
| 7,193,117 B2 | 3/2007 | Wachs |
| 7,229,548 B2 | 6/2007 | Riley |
| 7,232,515 B1 | 6/2007 | Demmin |
| 7,273,559 B2 | 9/2007 | Gibson |
| 7,282,151 B2 | 10/2007 | Parker |
| 7,288,182 B1 | 10/2007 | Soled |
| 7,361,316 B2 | 4/2008 | Rao |
| 7,387,983 B2 | 6/2008 | Hölzle |
| 7,465,334 B2 | 12/2008 | Moyes |
| 7,473,406 B2 | 1/2009 | Jasra |
| 7,485,267 B2 | 2/2009 | Marcantonio |
| 7,507,770 B2 | 3/2009 | Dogterom |
| 7,541,499 B2 | 6/2009 | Kanel |
| 7,648,941 B2 | 1/2010 | Soled |
| 7,649,079 B2 | 1/2010 | Niitani |
| 7,658,895 B2 | 2/2010 | Bhaduri |
| 7,674,369 B2 | 3/2010 | Abulnaga |
| 7,686,943 B2 | 3/2010 | Soled |
| 7,687,663 B2 | 3/2010 | Scaia |
| 7,737,072 B2 | 6/2010 | Mironov |
| 7,737,073 B2 | 6/2010 | Mironov |
| 7,763,096 B2 | 7/2010 | Rizkalla |
| 7,772,453 B2 | 8/2010 | Cerroni |
| 7,807,599 B2 | 10/2010 | Maesen |
| 7,833,501 B2 | 11/2010 | Kobayashi |
| 7,837,960 B2 | 11/2010 | Bhaduri |
| 7,846,404 B2 | 12/2010 | Bhaduri |
| 7,943,036 B2 | 5/2011 | Farshid |
| 7,947,623 B2 | 5/2011 | Mironov |
| 7,964,524 B2 | 6/2011 | Kuperman |
| 8,025,793 B2 | 9/2011 | Bhattacharyya |
| 8,048,292 B2 | 11/2011 | Powers |
| 8,057,763 B2 | 11/2011 | Oogjen |
| 8,062,508 B2 | 11/2011 | Soled |
| 8,067,331 B2 | 11/2011 | Eijsbouts-Spickova |
| 8,080,154 B2 | 12/2011 | Odueyungbo |
| 8,080,155 B2 | 12/2011 | Da Costa |
| 2002/0010088 A1 | 1/2002 | Eijsbouts |
| 2002/0045539 A1 | 4/2002 | Kasztelan |
| 2002/0112569 A1 | 8/2002 | Farone |
| 2003/0102254 A1 | 6/2003 | Eijsbouts |
| 2003/0150778 A1 | 8/2003 | Haluska |
| 2003/0178344 A1 | 9/2003 | Plantenga |
| 2004/0026329 A1 | 2/2004 | Ekman |
| 2004/0052708 A1 | 3/2004 | Rao |
| 2004/0163840 A1 | 8/2004 | Kanel |
| 2004/0171478 A1 | 9/2004 | Crabtree |
| 2004/0213715 A1 | 10/2004 | Lucien |
| 2004/0235653 A1 | 11/2004 | Domokos |
| 2004/0237720 A1 | 12/2004 | Moyes |
| 2004/0241066 A1 | 12/2004 | Jasra |
| 2005/0038299 A1 | 2/2005 | Wachs |
| 2005/0040080 A1 | 2/2005 | Riley |
| 2005/0054869 A1 | 3/2005 | Lugmair |
| 2005/0101480 A1 | 5/2005 | Ackerman |
| 2005/0112740 A1 | 5/2005 | Haase |
| 2005/0250863 A1 | 11/2005 | Green |
| 2006/0060502 A1 | 3/2006 | Soled |
| 2006/0060503 A1 | 3/2006 | Soled |
| 2006/0106248 A1 | 5/2006 | Scaia |
| 2006/0157386 A1 | 7/2006 | Al-Naeem |
| 2007/0084754 A1 | 4/2007 | Soled |
| 2007/0090023 A1 | 4/2007 | Soled |
| 2007/0090024 A1 | 4/2007 | Soled |
| 2007/0142674 A1 | 6/2007 | Kanel |
| 2007/0292745 A1 | 12/2007 | Shore |
| 2008/0060977 A1 | 3/2008 | Bhan |
| 2008/0131343 A1 | 6/2008 | Oogjen |
| 2008/0132407 A1 | 6/2008 | Bai |
| 2008/0275286 A1 | 11/2008 | Xiao |
| 2008/0306172 A1 | 12/2008 | Reynhout |
| 2008/0308462 A1 | 12/2008 | Eijsbouts-Spickova |
| 2009/0014356 A1 | 1/2009 | Eijsbouts-Spickova |

(56) References Cited

U.S. PATENT DOCUMENTS

| | | |
|---|---|---|
| 2009/0107883 A1 | 4/2009 | Maesen |
| 2009/0107889 A1 | 4/2009 | Maesen |
| 2009/0107891 A1 | 4/2009 | Kuperman |
| 2009/0111682 A1 | 4/2009 | Maesen |
| 2009/0111683 A1 | 4/2009 | Zhan |
| 2009/0111685 A1 | 4/2009 | Maesen |
| 2009/0111686 A1 | 4/2009 | Kuperman |
| 2009/0112010 A1 | 4/2009 | Maesen |
| 2009/0112011 A1 | 4/2009 | Maesen |
| 2009/0127165 A1 | 5/2009 | Eijsbouts-Spickova |
| 2009/0133536 A1 | 5/2009 | Bhaduri |
| 2009/0136399 A1 | 5/2009 | Bhaduri |
| 2009/0136400 A1 | 5/2009 | Bhaduri |
| 2009/0139904 A1 | 6/2009 | Eijsbouts-Spickova |
| 2009/0159505 A1 | 6/2009 | Da Costa |
| 2009/0163350 A1 | 6/2009 | Da Costa |
| 2009/0211945 A1 | 8/2009 | Eijsbouts-Spickova |
| 2009/0220406 A1 | 9/2009 | Rahman |
| 2009/0226352 A1 | 9/2009 | Hsu |
| 2009/0314684 A1 | 12/2009 | Kuperman |
| 2010/0025297 A1 | 2/2010 | Vierheilig |
| 2010/0044277 A1 | 2/2010 | Kuperman |
| 2010/0163459 A1 | 7/2010 | Odueyungbo |
| 2010/0163499 A1 | 7/2010 | Odueyungbo |
| 2010/0167910 A1 | 7/2010 | Odueyungbo |
| 2010/0167912 A1 | 7/2010 | Odueyungbo |
| 2010/0199807 A1 | 8/2010 | Stiksma |
| 2010/0234212 A1 | 9/2010 | Brait |
| 2010/0248945 A1 | 9/2010 | Eijsbouts-Spickova |
| 2010/0256433 A1 | 10/2010 | Knottenbelt |
| 2011/0100832 A1 | 5/2011 | Lubomirsky |
| 2011/0124493 A1 | 5/2011 | Kuperman |
| 2011/0124494 A1 | 5/2011 | Mironov |
| 2011/0124496 A1 | 5/2011 | Mironov |
| 2011/0124498 A1 | 5/2011 | Kuperman |
| 2011/0155636 A1 | 6/2011 | Hanks |
| 2011/0163009 A1 | 7/2011 | Novak |
| 2011/0308997 A1 | 12/2011 | Bhattacharyya |

FOREIGN PATENT DOCUMENTS

| | | |
|---|---|---|
| EP | 2103347 | 9/2009 |
| WO | 0204117 | 1/2002 |
| WO | 2007070394 | 6/2007 |
| WO | 2012/064467 | 5/2012 |

OTHER PUBLICATIONS

Hein et al., "Understanding Hydrodenitrogeneration on Novel Unsupported Sulfide Mo—W—Ni Catalysts," *Catalysis—Innovative Applications in Petrochemistry and Refining*, DGMK Conference Oct. 4-6, 2011, Dresden, Germany, 5 pages.

Hein et al, "Surface chemistry and catalysis of unsupported Mo—W—Ni sulfides," 15$^{th}$ International Congress on Catalysis 2012, Jul. 1, 2012, Munich, Germany, 2 pages.

Vilesov et al., "Unsupported Nickel—Tungsten Sulfides as Catalysts for the Hydrodearomatization Processes," Green Solvents for Synthesis, Oct. 8, 2012, 2 pages.

HYDROCONVERSION MULTI-METALLIC CATALYSTS AND METHOD FOR MAKING THEREOF

CROSS-REFERENCE TO RELATED APPLICATIONS

This application claims benefit under 35 USC 119 of U.S. Provisional Patent Application No. 61/697,063 with a filing date of Sep. 5, 2012 and 61/801,683 with a filing date of Mar. 15, 2013.

TECHNICAL FIELD

The invention relates generally to a self-supported mixed metal sulfide (MMS) catalyst for use in hydroprocessing, processes for preparing the catalyst, and hydroconversion processes employing the multi-metallic catalyst.

BACKGROUND

In the crude oil market, there is a premium for refineries to process feeds derived from more refractory crudes into high value finished products. These refractory feeds are characterized by a higher density resulting from an increased fraction of aromatic compounds with a low hydrogen content. Therefore, these feeds require deeper hydrogenation (more extensive saturation of aromatic compounds) to produce fuels that meet specifications, such as viscosity, cold flow properties, cetane index, smoke point, emission requirements. The volumetric productivity of such a process provides higher benefits to refineries that deploy hydrogenation (HYD) catalysts powerful enough to meet the required hydrogenation activity.

Although hydrogenation is an important aspect of refining high density feeds, deep hydrogenation catalysts need to deliver more than maximizing the increase in volume between feed and refined products. In the wake of European environmental legislation, there is a global trend towards more stringent legislation that mandates environmentally friendly transportation fuels. An example is the mandate that all diesel produced in and imported into the US will have to be ultra-low-sulfur diesel (ULSD) as of Dec. 1, 2014. This change to transportation fuels with the low sulfur content allows for application of newer emission control technologies that should substantially lower emissions of particulate matter from diesel engines. Environmental mandates to remove contaminants like sulfur from refined oil products implies a need for catalysts which combine a deep hydrogenation (HYD) capability with a deep hydrodesulfurization (HDS) activity. This deep hydrodesulfurization activity is particularly important in refining high-density feed stocks, because a higher density typically implies a higher concentration of contaminants such as organic sulfur and nitrogen molecules, as well as metals and asphaltenes (i.e. multi-ring based aromatic compounds with a low solubility even in the most aromatic solvents).

Deep hydrodesulfurization is accomplished most efficiently through a combination of: 1) hydrogenation (HYD), which releases sulfur atoms after saturating the ring structure of parent aromatic compounds and 2) hydrogenolysis (HYL), which breaks the bond between a sulfur atom and the carbon atom(s) in the sulfur containing molecule, such as aromatic ring compounds. This implies that optimum catalysts for the deep hydrogenation of high-density feed stocks are expected to exhibit an appropriate balance between hydrogenation and hydrogenolysis functions. Catalysts that are suitable for hydroprocessing (e.g. hydrodesulfurization and hydrodenitrogenation) generally comprise molybdenum or tungsten sulfide or sulfocarbide, in combination with an element such as cobalt, nickel, iron, or a combination of thereof. Attempts have been made to modify the morphology of hydroprocessing catalysts to provide ways to control their activity and selectivity. For example, U.S. Pat. No. 4,528,089 discloses that catalysts prepared from carbon-containing catalyst precursors are more active than catalysts prepared from sulfide precursors without organic groups.

Considerable experimental and modeling efforts have been underway to better understand complex metal sulfide catalysts, including factors that control metal sulfide morphology. U.S. Pat. Nos. 7,591,942 and 7,544,632 demonstrate that sulfiding a self-supported multi-metallic catalyst in the presence of a surfactant amine gives a catalyst comprising stacked layers of molybdenum or tungsten sulfide with a reduced number of layers in stacks. A lower number of layers in stacks implies the presence of smaller crystals of molybdenum, tungsten or molybdenum tungsten sulfides, which can result in larger surface areas available for catalysis.

The saturation of aromatic compounds in distillate fractions, e.g. vacuum gas oil, heavy coker gas oil or diesel fuel has also drawn attention of researchers. A high aromatic content is associated with high density, poor fuel quality, low cetane numbers of diesel fuel and low smoke point values of jet fuel. High hydrodenitrogenation (HDN) activity is typically associated with aromatic saturation activity of nickel tungsten sulfides catalysts; while high hydrodesulfurization (HDS) activity associates with high hydrogenolysis activity of cobalt molybdenum sulfide catalysts.

There is still a need for improved catalysts with improved catalytic activity and resistance towards deactivation, specifically self-supported mixed metal sulfide catalysts for use in the hydroprocessing of lower grade, more refractory hydrocarbon feeds, capable of generating low aromatic products meeting new emission requirements. There is also a need for a better understanding of structure—performance relationships for these catalysts to design next generation of highly active self-supported catalysts for use in hydroprocessing.

SUMMARY

In one aspect, the invention relates to a self-supported mixed metal sulfide (MMS) catalyst consisting essentially of nickel sulfide and tungsten sulfide, wherein the catalyst contains Ni:W in a mole ratio of 1:3 to 4:1, on a transition metal basis. In one embodiment, the catalyst further comprises a metal promoter selected from Mo, Nb, Ti, and mixtures thereof, wherein the metal promoter is present in an amount of less 1% (mole).

In a second aspect, the invention relates to a MMS catalyst consisting essentially of molybdenum sulfide and tungsten sulfide, wherein the catalyst contains at least 0.1 mol % of Mo and at least 0.1 mol % of W, on a transition metal basis. In one embodiment, the catalyst is characterized as having an HDS reaction rate constant of at least 10% higher than that of a catalyst comprising molybdenum sulfide alone or a catalyst comprising tungsten sulfide alone, when compared on same metal molar basis in hydrotreating a Heavy Coker Gas Oil as a feedstock at identical process conditions as indicated in Table E.

In a third aspect. the invention relates to a MMS catalyst comprising molybdenum sulfide, nickel sulfide, and tungsten sulfide, wherein the catalyst is characterized by an HDN reaction rate constant of at least 100 g feed $hr^{-1}$ g catalyst $^{-1}$ assuming first order kinetics, and an HDS reaction rate constant of at least 550 g feed $hr^{-1}$ g catalyst $^{-1}$ assuming first order kinetics in hydrotreating of a Heavy Coker Gas Oil as a feedstock with properties indicated in Table A and at given process conditions as indicated in Table E. In one embodiment, the catalyst is characterized by an HDN reaction rate constant of at least 4 hr$^{-1}$ assuming first order kinetics, and an HDS reaction rate constant of at least 5 hr$^{-1}$ assuming first order kinetics in hydrotreating of a Heavy Vacuum Gas Oil as a feedstock with properties indicated in Table B and at the steady state process conditions as indicated in Table F. In another embodiment, the catalyst is characterized by an HYD reaction rate constant and an HYL reaction rate constant of at least 10% higher than the rate constants of a catalyst comprising nickel sulfide and molybdenum sulfide, or a catalyst comprising nickel sulfide and tungsten sulfide, when compared on same metal molar basis in hydrotreating a diphenylether as a feedstock at identical process conditions as indicated in Table C.

In a fourth aspect, the invention relates to a MMS catalyst comprising molybdenum sulfide, nickel sulfide, and tungsten sulfide, and wherein the catalyst is characterized as having molar ratios of metal components Ni:Mo:W in a region defined by five points ABCDE of a ternary phase diagram, and wherein the five points ABCDE are defined as: A (Ni=0.72, Mo=0.00, W=0.25), B (Ni=0.25, Mo=0.00, W=0.75), C (Ni=0.25, Mo=0.25, W=0.50), D (Ni=0.60, Mo=0.25, W=0.15), E (Ni=0.72, Mo=0.13, W=0.15). In one embodiment, the catalyst is characterized having a molar ratio of metal components Ni:Mo:W in a range of: $0.33 \leq \text{Ni}/(\text{W}+\text{Mo}) \leq 2.57$; $0.00 \leq \text{Mo}/(\text{Ni}+\text{W}) \leq 0.33$; and $0.18 \leq \text{W}/(\text{Ni}+\text{Mo}) \leq 3.00$.

In a fifth aspect, the invention relates to a MMS catalyst comprising molybdenum sulfide, nickel sulfide, and tungsten sulfide, wherein the catalyst is characterized as having a multi-phased structure comprising five phases: a molybdenum sulfide phase, a tungsten sulfide phase, a molybdenum tungsten sulfide phase, an active nickel phase, and a nickel sulfide phase. In one embodiment, the molybdenum tungsten sulfide phase comprises at least a layer, wherein the at least a layer contains at least one of: a) molybdenum sulfide and tungsten sulfide; b) tungsten isomorphously substituted into molybdenum sulfide as individual atoms or as tungsten sulfide domains; c) molybdenum isomorphously substituted into tungsten sulfide as individual atoms or as molybdenum sulfide domains; and d) mixtures thereof.

In a sixth aspect, the invention relates to a MMS catalyst comprising molybdenum (Mo) sulfide, tungsten (W) sulfide, and nickel (Ni) sulfide, wherein the catalyst has a BET surface area of at least 20 m$^2$/g and a pore volume of at least 0.05 cm$^3$/g. In one embodiment, the catalyst has a BET surface area of at least 30 m$^2$/g.

In a seventh aspect, the invention relates to a method for making a MMS catalyst, the method comprising mixing a sufficient amount of a nickel (Ni) metal precursor, a sufficient amount of a molybdenum (Mo) metal precursor, and a sufficient amount of a tungsten (W) metal precursor to produce a catalyst precursor having a molar ratio Ni:Mo:W in relative proportions defined by a region of a ternary phase diagram showing transition metal elemental composition in terms of nickel, molybdenum, and tungsten mol-%, wherein the region is defined by five points ABCDE and wherein the five points are: A (Ni=0.72, Mo=0.00, W=0.28), B (Ni=0.55, Mo=0.00, W=0.45), C (Ni=0.48, Mo=0.14, W=0.38), D (Ni=0.48, Mo=0.20, W=0.33), E (Ni=0.62, Mo=0.14, W=0.24); and sulfiding the catalyst precursor under conditions sufficient to convert the catalyst precursor into a sulfide catalyst.

DETAILED DESCRIPTION

Figure 1:
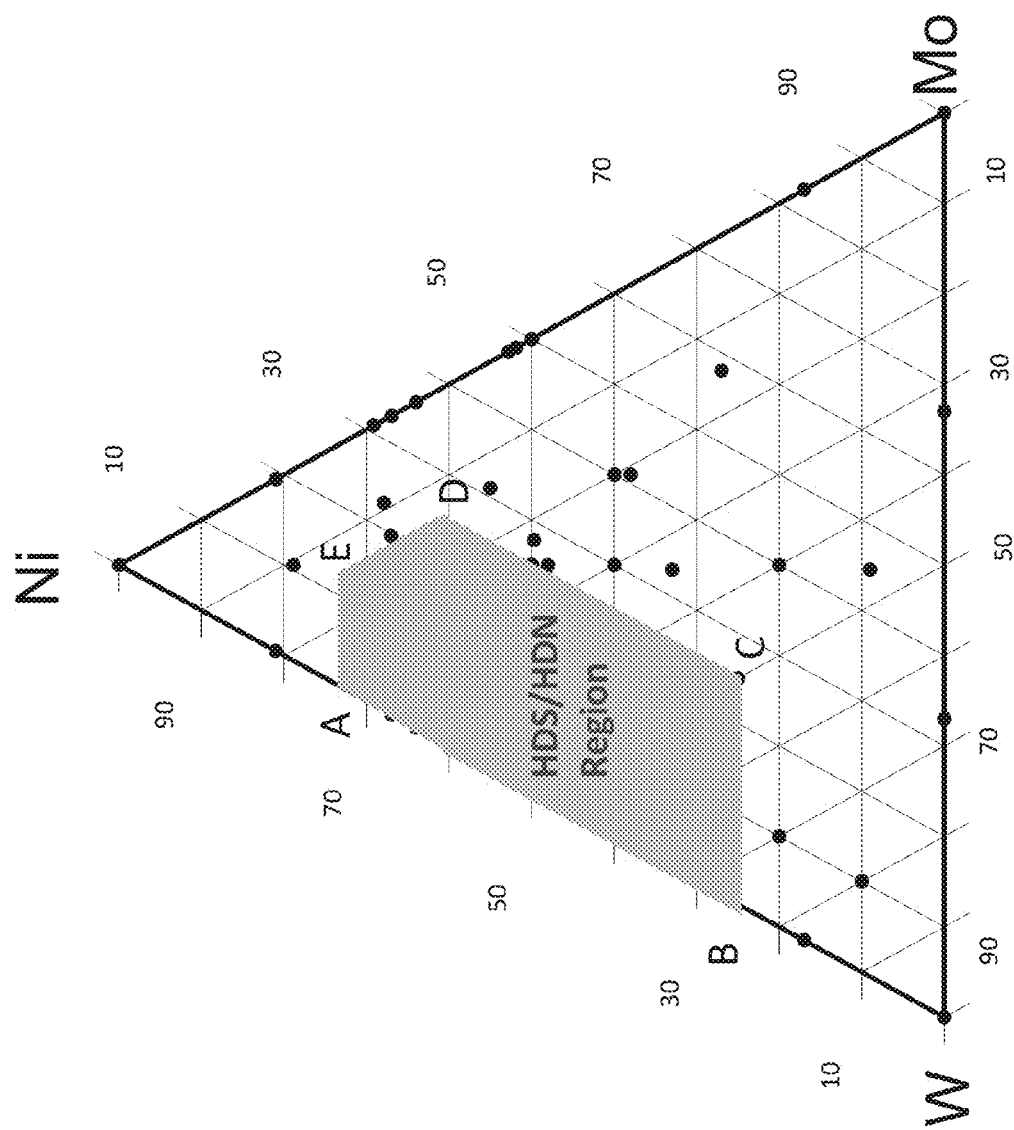
FIG. 1 is a ternary phase diagram showing contents of nickel, molybdenum, and tungsten as atomic % on 100% metal basis in self-supported catalysts optimized to have significantly enhanced HYL, HYD, HDS and HDN activities, as compared to multi-metallic catalysts of the prior art.

The following terms will be used throughout the specification and will have the following meanings unless otherwise indicated.

References to terms such as "edge," "basal," "rim," and "layer," can be found in "Structural Studies of Catalytically Stabilized Industrial Hydrotreating Catalysts," by De la Rosa et al., Science Highlight November 2004.

Reference to "slab" refers to the crystal morphology of single particles or particle agglomerates of nickel sulfide.

The Periodic Table referred to herein is the Table approved by IUPAC and the U.S. National Bureau of Standards. An example is the Periodic Table of the Elements by Los Alamos National Laboratory's Chemistry Division of October 2001.

"Self-supported" may be used interchangeably with "bulk catalyst" or "unsupported catalyst," meaning that the catalyst composition is not of the conventional catalyst form which consists of a catalyst deposited on a preformed shaped catalyst support. In one embodiment, the self-supported catalyst is formed through precipitation. In another embodiment, the self-supported catalyst has a binder incorporated into the catalyst composition. In yet another embodiment, the self-supported catalyst is formed from metal compounds and without any binder.

"One or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and $Z_n$).

"Molybdenum sulfide" refers to $MoS_{2+e}$ where e has a value between 0 and 1, and in one embodiment further comprises carbide, nitride, and/or sulfocarbide domains. $MoS_2$ as used herein is by way of exemplification for molybdenum sulfide or $MoS_{2+e}$ in general, and is not intended to exclude any molybdenum sulfide not represented by the formula.

"Tungsten sulfide" refers to $WS_{2+e}$ where e may have a value between 0 and 1, and in one embodiment further comprises carbide, nitride, and/or sulfocarbide as well as oxysulfide domains. $WS_2$ as used herein is by way of exemplification for tungsten sulfide or $WS_{2+e}$ in general, and is not intended to exclude any tungsten sulfide not represented by the formula.

"Heavy Coker Gas Oil" refers to a coker gas oil feedstock with the following properties: API of 31.4 (0.8686 g/ml); C of 85.7 wt %; H of 12.246 wt %; N of 1986 ppm; S of 1.6680 wt. %; Bromine number of 37; total aromatics of 35.2 wt. %, distributed as mono-aromatics of 23.3 wt. % and poly-aromatics of 11.9 wt. %, with a boiling point distribution as shown in Table A below.

TABLE A (Simulated Distillation)

| Wt. % | (° F.) |
|---|---|
| 0.5 | 323 |
| 5 | 416 |
| 10 | 443 |
| 30 | 493 |
| 50 | 527 |
| 70 | 557 |
| 90 | 588 |
| 95 | 601 |
| 99 | 624 |
| 99.5 | 629 |

"Heavy Vacuum Gas Oil" refers to a vacuum gas oil feedstock with the following properties: API of 21.1 (0.9273 g/ml); C of 84.89%; H of 11.951%; N of 974 ppm; S of 2.335 wt. %; viscosity at 100° F. of 9.357 cst, with a boiling point distribution as shown in Table B below.

TABLE B (Simulated Distillation)

| Wt % | (° F.) |
|---|---|
| 0.5 | 627 |
| 5 | 702 |
| 10 | 737 |
| 30 | 805 |
| 50 | 855 |
| 70 | 907 |
| 90 | 975 |
| 95 | 1002 |
| 99 | 1049 |
| 99.5 | 1063 |

Hydrogenolysis (HYL) reaction conditions of diphenylether (model feed) are shown in the Table C below, and also detailed in the Experiment section:

TABLE C

| Reactor | | 1 L batch autoclave |
|---|---|---|
| Catalyst precursor | | Organo metallic compounds of nickel, molybdenum and tungsten |
| Sulfiding agent | | DMDS, $CS_2$ |
| Feed | | diphenylether |
| Solvent | | hexadecane |
| Atomsphere | | $H_2$ |
| Stir rate | | 750 rpm |
| Reaction conditions | Temperature ramping | RT → 382° C. in 2 hr |
| | Pressure | 1800 psig |
| | Temperature | 382° C. (720° F.) |
| | Residence time | 0.5 hr |
| Quench | | Below 100° C. within 2 min |

Hydrogenation (HYD) reaction conditions for benzene (model feed) are shown in the Table D below, and also detailed in the Experiment section:

TABLE D

| Reactor | | 1 L batch autoclave |
|---|---|---|
| Catalyst precursor | | Organo metallic compounds of nickel, molybdenum and tungsten |
| Sulfiding agent | | DMDS, $CS_2$ |
| Feed | | benzene |
| Solvent | | hexadecane |
| Atomsphere | | $H_2$ |
| Stir rate | | 750 rpm |
| Reaction conditions | Temperature ramping | RT → 382° C. in 2 hr |
| | Pressure | 1800 psig |
| | Temperature | 382° C. (720° F.) |
| | Residence time | 0.5 hr |
| quench | | Below 100° C. within 2 min |

HDS and HDN reaction conditions for Heavy Coker Gas Oil (properties in Table A) are listed below in Table E, and also detailed in the Experiment section:

TABLE E

| Reactor | | 1 L batch autoclave |
|---|---|---|
| Catalyst precursor | | Organo metallic compounds of nickel, molybdenum and tungsten |
| Sulfiding agent | | DMDS, $CS_2$ |
| fFeed | | Heavy Coker Gas Oil |
| solvent | | hexadecane |
| Atomsphere | | $H_2$ |
| Stir rate | | 750 rpm |
| Sulfiding Conditions | Temperature ramping | RT → 250° C. (40 min) → 250° C. (2.5 hr) → 343° C. (70 min) → 343° C. (2 hr) |
| | Pressure | 1800 psig |
| | Quench | Below 100° C. within 2 min |

TABLE E-continued

| Reaction conditions | Temperature ramping | RT → 382° C. in 2 hr |
|---|---|---|
| | Pressure | 1800 psig |
| | Temperature | 382° C. (720° F.) |
| | Residence time | 0.5 hr |
| | Quench | Below 100° C. within 2 min |

HDS and HDN reaction conditions for Heavy Vacuum Gas Oil (properties in Table B) are shown in the Table F below, and also detailed in the Experiment section:

TABLE F

| Reactor | | 1 L batch autoclave |
|---|---|---|
| Catalyst precursor | | Hydroxide catalyst precursor |
| Sulfiding agent | | DMDS in straight run diesel with 2.5 wt % sulfur |
| Feed | | Heavy Vacuum Gas Oil |
| Atomsphere | | $H_2$ |
| Sulfiding Conditions | Temperature | 400-500° F. for low temperature sulfiding by 600-700° F. for high temperature sulfiding |
| | Pressure | 0-2700 psig |
| Reaction conditions | Temperature | 700° F. |
| | Pressure | 2300 psig |
| | LHSV | 2 hr$^{-1}$ |
| | $H_2$ to feed ratio | 5000 scf/bbl, once through $H_2$ |

Mixed metal sulfide ("MMS") catalyst refers to a catalyst containing transition metal sulfides of molybdenum, tungsten, and nickel in one embodiment, and of nickel and molybdenum or nickel and tungsten in a second embodiment and molybdenum and tungsten in yet another embodiment.

The size of crystalline domain L is determined by the Scherrer equation of $L = k \lambda/(\Delta(2\theta) \times \cos \theta)$; wherein $\lambda$ is the wavelength of incident beam, when Cu k$\alpha$1 is used, $\lambda = 1.5406$ Å; $k = 0.89$; $\Delta(2\theta)$ is the FWHM (full width at half maximum); and $\theta$ is an angular position of reflection peak measured in degrees.

"Hydroconversion" or "hydroprocessing" means any process that is carried out in the presence of hydrogen, including, but not limited to, methanation, water gas shift reactions, hydrogenation, hydrotreating, hydrodesulphurization, hydrodenitrogenation, hydrodeoxygenation, hydrodecarboxylation, hydrodecarbonylation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved viscosities, viscosity indices, saturates content, density, low temperature properties, volatilities and depolarization, etc. The reactions include one or more of: molecular weight reduction by catalytic or thermal cracking; heteroatom or metal removal; asphaltene or carbon residue reduction; olefin or aromatic saturation (ASAT); and skeletal or double bond isomerization.

Hydrogenolysis ("HYL") refers to a reaction whereby a carbon-carbon or carbon-heteroatom single bond is cleaved or undergoes "lysis" by hydrogen. The heteroatom is generally oxygen, sulfur, nitrogen, or a heavy metal. Catalytic hydrogenolysis commonly occurs in hydrodeoxygenation (HDO) to remove oxygen and hydrodesulfurization (HDS) to remove sulfur as the heteroatoms in oil feedstock. An example of HDO is shown below, wherein at least a portion of oxygen removal from phenol occurs via the direct cleavage of the C(SP$^2$)-O bond to form benzene.

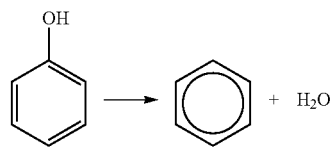

An example of HDS is shown below, wherein at least a portion of sulfur removal from dibenzylthiophene occurs via the direct cleavage of the C(sp$^2$)-S bond ("HYL" reaction indicated by $k_{sp}$) to form biphenyl.

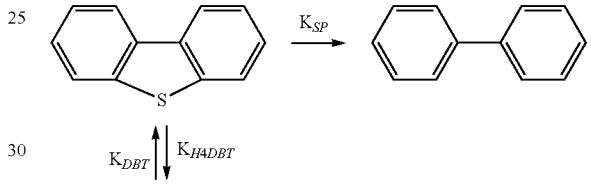

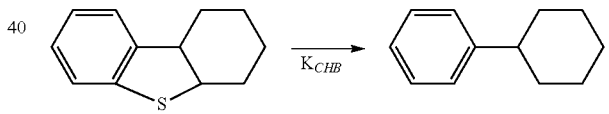

Hydrogenation ("HYD"), or treating with hydrogen, refers to a chemical reaction between hydrogen and another compound, generally constituting the addition of hydrogen atoms to a molecule. Hydrogenation generally occurs in the hydrodenitrogenation (HDN) to remove nitrogen. An example of HDN is as illustrated below, wherein nitrogen removal from quinoline starts from either partially hydrogenating, or fully hydrogenating the aromatic rings of the molecule before C—N bond breakage occur via hydrogenolysis followed by de-amination through Hofmann elimination:

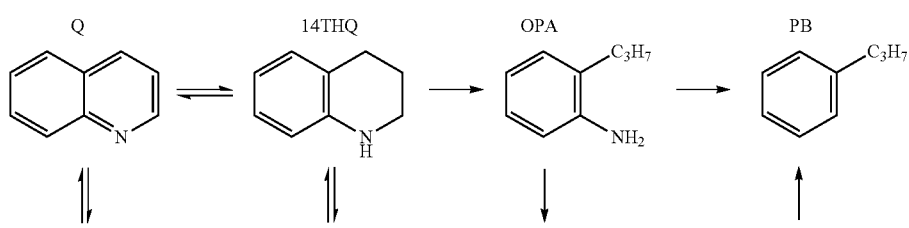

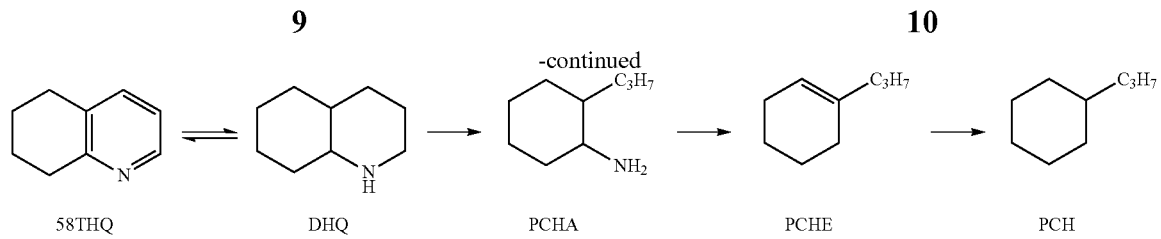

58THQ   DHQ   PCHA   PCHE   PCH

Refineries increasingly have to deal with heavier feedstocks, such as refractory feeds containing condensed aromatic sulfur compounds of alkyl dibenzylthiophene type. With the ULSD requirements of 10-15 wppm, it also means that refineries have to desulfurize these sulfur compounds down to below the specified levels. The complex sulfur molecules behave similarly to the aromatic nitrogen species, requiring to be hydrogenated (HYD) first before the C—S bond cleavage (HYL).

Traditionally, catalysts for hydroprocessing of refractory feedstocks comprise molybdenum sulfide and tungsten sulfide catalysts with some of the Mo (or W) cations substituted by promoter metal Co or Ni. The resultant cobalt molybdenum sulfide system is recognized for enhanced HYL activities as it is generally believed that the presence of cobalt facilitates the C—S bond cleavage. On the other hand, nickel tungsten sulfide and nickel molybdenum sulfide systems are recognized for enhanced HYD activities.

In one embodiment, the invention relates to self-supported MMS catalysts having optimized hydrogenation (HYD) and hydrogenolysis (HYL) activities, and thus outstanding HDN and HDS performance. The invention also relates to methods of preparation of self-supported catalysts with balanced hydrogenation (HYD) and hydrogenolysis (HYL) activities for the hydroprocessing of refractory feeds. In one embodiment, the self-supported MMS catalysts contain at least two metals from Group VIB, e.g., Mo and W, and at least a metal from Group VIII, such as Ni, and multiphase combinations thereof.

Self-Supported Catalyst Having Optimized HDS/HDN Activities:

It was discovered that a MMS catalysts containing nickel, tungsten, and molybdenum sulfides within a range of optimum metal ratios exhibit a unique combination of both the enhanced HYL activity of the mixed molybdenum tungsten sulfide and the enhanced HYD activity of the mixed nickel tungsten or nickel molybdenum sulfides, and consequently enhanced combinations of HDS and HDN activities compared to MMS catalysts of binary metal sulfide compositions. It was also discovered that a MMS catalysts containing tungsten and molybdenum sulfides within a wide range of compositions exhibit synergy between the components as manifested in improved HYL activity and therefore enhanced HDS activity when compared to molybdenum sulfide catalysts. It was further discovered that in a mixed nickel tungsten sulfide catalyst systems having the nickel-to-tungsten ratio within an optimum range, there is synergy between the components such as that an active nickel phase enhances the HYD activity of the catalyst and therefore HDN activity, as compared to either active nickel or tungsten sulfide catalysts. A similar effect was observed for a mixed nickel molybdenum sulfide catalyst system.

With respect to the BET surface area and pore volume (PV) characteristics, the self-supported MMS catalyst containing molybdenum, tungsten, and nickel sulfides in the optimum compositional range in one embodiment is characterized as having a BET surface area of at least 20 $m^2/g$, and a pore volume of at least 0.05 $cm^3/g$. The BET surface is at least 30 $m^2/g$ in a second embodiment, and at least 40 $m^2/g$ in a third embodiment. The MMS catalyst is further characterized as having minimal shrinkage, with a surface area of at least 20% of the original value (i.e., a surface are reduction of less than 80%) after being exposed to a Heavy Coker Gas Oil of at least 0.5 hrs in a hydrotreating process. The original value refers to the surface area of the freshly prepared catalyst prior to the exposure. Examination of the XPS data for a self-supported MMS catalysts containing molybdenum, tungsten, and nickel within an optimum composition range shows a Ni surface concentration to Ni bulk concentration ratio of at least 0.4 mol/mol; a W surface concentration to W bulk concentration ratio of at least 0.3 mol/mol in one embodiment; a Ni surface/Ni bulk concentration ratio of at least 0.5 mol/mol; and a W surface/W bulk concentration ratio of at least 0.4 mol/mol in another embodiment.

In one embodiment, the self-supported mixed metal sulfide catalysts exhibiting a combination of optimum HYL and HYD performance in hydrotreating are characterized by having an optimized Ni:Mo:W composition with a range of Ni/(Ni+W+Mo) ratios of $0.25 \leq Ni/(Ni+Mo+W) \leq 0.8$, a range of Mo/(Ni+Mo+W) molar ratios of $0.0 \leq Mo/(Ni+Mo+W) \leq 0.25$, and a range of W/(Ni+Mo+W) molar ratios of $0.12 \leq W/(Ni+Mo+W) \leq 0.75$.

In another embodiment, a self-supported catalyst exhibits optimum performance when the relative molar amounts of nickel, molybdenum and tungsten are within a compositional range defined by five points ABCDE in the ternary phase diagram of FIG. 1, showing the element contents of nickel, molybdenum and tungsten in terms of their molar fractions. The five points ABCDE are defined by A (Ni=0.80, Mo=0.00, W=0.20), B (Ni=0.25, Mo=0.00, W=0.75), C (Ni=0.25, Mo=0.25, W=0.50), D (Ni=0.63, Mo=0.25, W=0.12), E (Ni=0.80, Mo=0.08, W=0.12).

In one embodiment, the molar ratio of metal components Ni:Mo:W is in a range of: $0.33 \leq Ni/(Mo+W) \leq 2.57$, a range of Mo/(Ni+W) molar ratios of $0.00 \leq Mo/(Ni+W) \leq 0.33$, and a range of W/(Ni+Mo) molar ratios of $0.18 \leq W/(Ni+Mo) \leq 3.00$. In yet another embodiment, the molar ratios of metal components Ni:Mo:W in a region is defined by six points ABCDEF of a ternary phase diagram, and wherein the six points ABCDEF are defined as: A (Ni=0.67, Mo=0.00, W=0.33), B (Ni=0.67, Mo=0.10, W=0.23), C (Ni=0.60, Mo=0.15, W=0.25), D (Ni=0.52, Mo=0.15, W=0.33), E (Ni=0.52, Mo=0.06, W=0.42), F (Ni=0.58, Mo=0.0, W=0.42). In another embodiment, the molar ratio of metal components Ni:Mo:W in a range of: $1.08 <= Ni/(Mo+W) <= 2.03$; $0 <= Mo/(Ni+W) <= 0.18$; and $0.33 <= W/(Mo+Ni)) <= 0.72$.

In yet another embodiment, the molar ratios of metal components Ni:Mo:W in a region is defined by four points ABCD of a ternary phase diagram, and wherein the four points ABCD are defined as: A (Ni=0.67, Mo=0.00, W=0.33), B (Ni=0.58, Mo=0.0, W=0.42), C(Ni=0.52, Mo=0.15, W=0.33), D (Ni=0.60, Mo=0.15, W=0.25).

Figure 2:
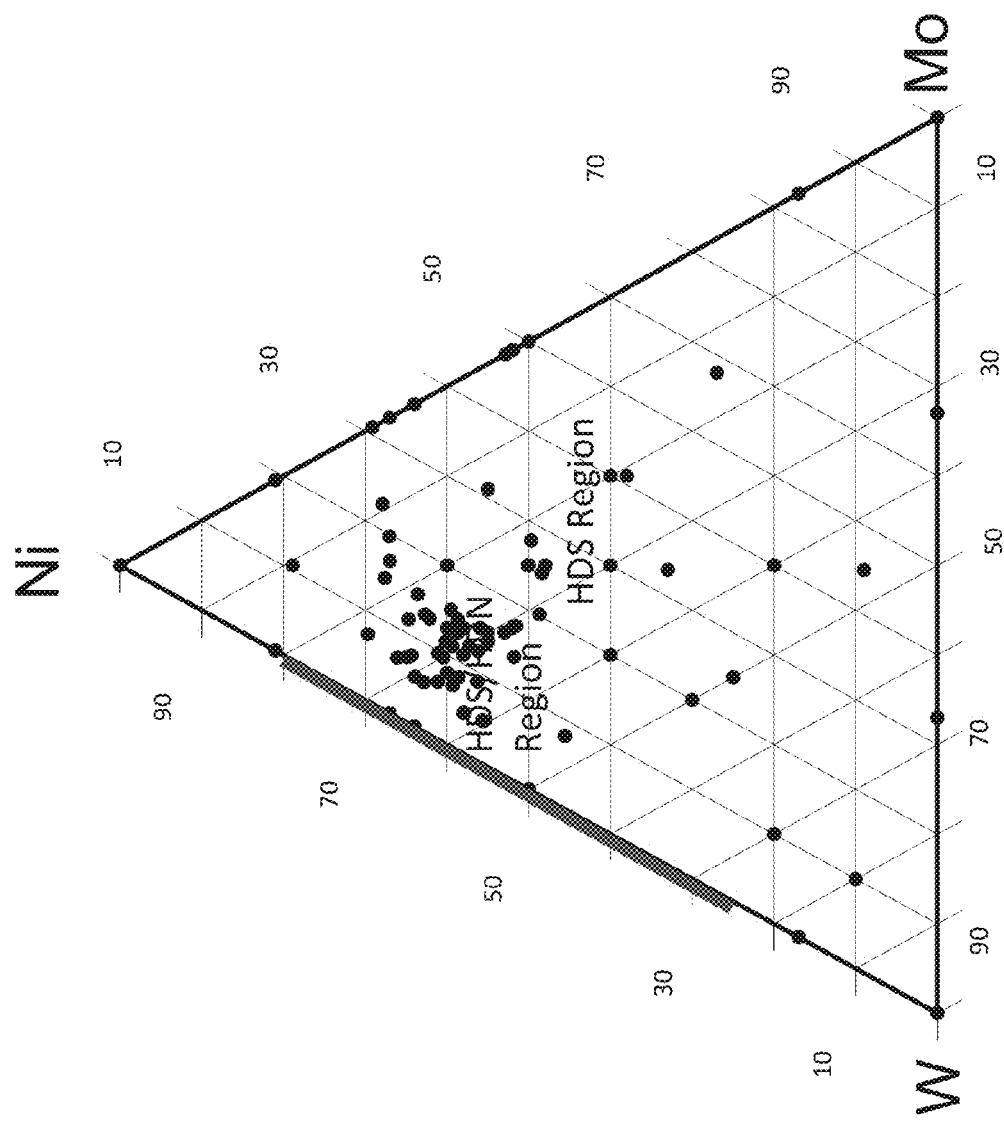
FIG. 2 is a ternary phase diagram showing contents of nickel and tungsten as atomic % on 100% metal basis in self-supported catalysts, optimized to have significantly enhanced HYD and HDN activities.

In one embodiment, a bi-metallic nickel tungsten sulfide self-supported catalyst exhibits optimum HYD and HDN performance when the relative molar amounts of nickel, and tungsten are in an optimum range defined by E (Ni=0.25, W=0.75) and F (Ni=0.8, W=0.2) in the ternary phase diagram of FIG. 2, for a Ni:W molar ratio ranges from 1:3 to 4:1, on a transition metal basis). In yet another embodiment, the bi-metallic catalyst further comprises a metal promoter selected from Mo, Nb, Ti, and mixtures thereof, wherein the metal promoter is present in an amount of less 1% (mole).

Figure 3:
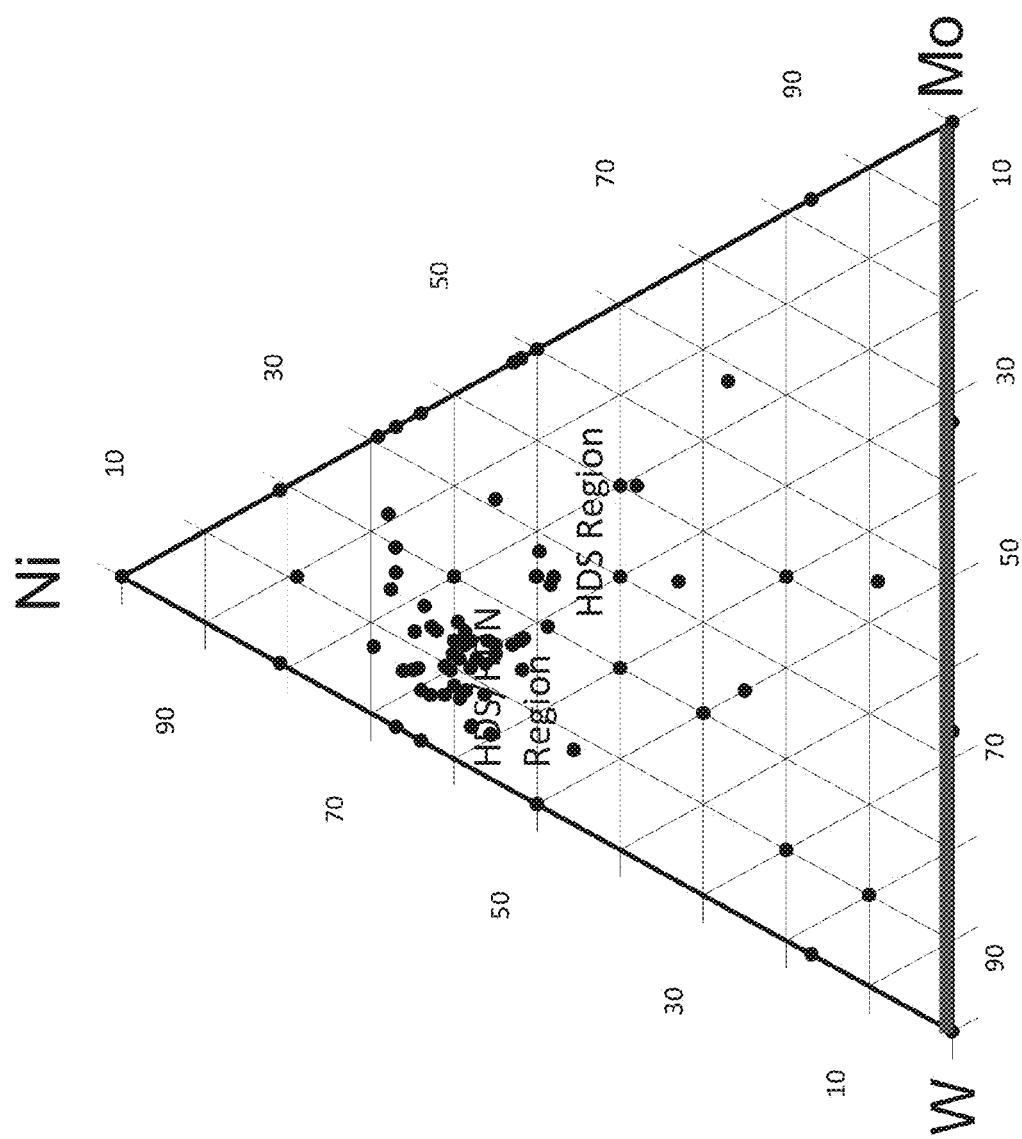
FIG. 3 is a ternary phase diagram showing contents of molybdenum and tungsten as atomic % on 100% metal basis in self-supported catalysts, optimized to have significantly enhanced HYL and HDS activities.

In another embodiment, a bi-metallic molybdenum tungsten sulfide self-supported catalyst exhibits improved HYL and HDS performance comparing to molybdenum sulfide alone or tungsten sulfide alone when the relative molar amounts of nickel, and tungsten are in the optimum range defined by G (Mo=0.001, W=0.999) and H (Mo=0.999, W=0.001) in the ternary phase diagram of FIG. 3 (with at least 0.1 mol % of Mo and at least 0.1 mol % of W, on a transition metal basis).

It is observed that the MMS catalyst containing molybdenum, tungsten, and nickel within an optimum composition range has a variation of HDS reaction rate constant and an HDN reaction rate constant (after normalized to surface area and Ni surface concentration) within 20%, independent of the starting metal precursors, and independent of whether prepared from inorganic metal salts or organo-metallic compounds as starting reagents.

In one embodiment, the self-supported catalysts are prepared from sources of nickel, molybdenum and tungsten in their elemental, compound, or ionic form ("metal precursors"). Examples of molybdenum precursors include but are not limited to alkali metal molybdates (e.g. alkali metal heptamolybdates, alkali metal orthomolybdates, alkali metal isomolybdates), ammonium metallates of molybdenum (e.g., ammonium molybdate and also iso-, peroxo-, di-, tri-, tetra-, hepta-, octa-, or tetradecamolybdate), other inorganic molybdenum compounds (e.g. molybdenum sulphate, phosphate, silicate, borate), organic molybdenum compounds (e.g., molybdenum naphthenate, pentacyclodienyl molybdate, cyclopentadienyl Mo tricarbonyl dimer), alkali metal tungstates (e.g. alkali metal heptatungstates, alkali metal orthotungstates, alkali metal iso tungstates), ammonium metallates of tungsten (e.g., ammonium tungstate and also iso-, peroxo-, di-, tri-, tetra-, hepta-, octa-, or tetradeca tungstate), other inorganic tungsten compounds (e.g. tungsten sulphate, phosphate, silicate, borate), organic tungsten compounds (e.g., tungsten naphthenate, pentacyclodienyl tungsten dihydride), other inorganic nickel, molybdenum or tungsten single metal or compounds (e.g. ammonium salts of phosphomolybdic acids, phosphomolybdic acid, molybdenum oxide, tungsten oxide, nickel carbonate, nickel hydroxide, nickel phosphate, nickel phosphite, nickel formate, nickel fumarate, nickel molybdate, nickel tungstate, nickel oxide, nickel alloys such as nickel-molybdenum alloys, Raney nickel, etc.), ionic salts (e.g., Mo—P heteropolyanion compounds, Mo—Si heteropolyanion compounds, W—P heteropolyanion compounds, W—Si heteropolyanion compounds and Ni—Mo—W heteropolyanion compounds), and organo metallic compounds (e.g., cyclopentadienyl nickel, and nickel naphthenate). In one embodiment, the metal precursors are inorganic metal sulfides of nickel, molybdenum, tungsten and their combinations, e.g. $Ni_3S_2$, $Ni_9S_8$, $Ni_2S$, NiS, $MoS_3$, $MoS_2$, $WS_3$, $WS_2$, $MoWS_x$, $NiMoS_x$, $NiWS_x$, $NiMoWS_x$. In another embodiment, the metal precursors are single metal or sulfur-containing compounds, which can be inorganic or organic. Examples include but are not limited to, e.g., ammonia tetrathio molybdate, ammonia tetrathio tungstate, and Molyvan™ A, a commercially available material from R.T.Vanderbilt Co., Inc.

In one embodiment, the MMS catalysts are prepared by sulfiding an oxide or hydroxide catalyst precursor containing nickel, molybdenum and tungsten with a composition inside the optimum range. The catalyst precursor is optionally prepared in the presence of a ligand "L" ("ligating agent," "chelating agent" or "complexing agent" or chelator, or chelant), referring to a compound that has one or more pairs of electrons available for the formation of coordinate bonds forming a larger complex. Examples of ligands include but are not limited to $NH_3$, alkyl and aryl amines, carboxylates, carboxylic acids, aldehydes, ketones, the enolate forms of aldehydes, the enolate forms of ketones, and hemiacetals; organic acid addition salts, and mixtures thereof.

In one embodiment, molybdenum and tungsten metal precursors are first mixed with at least one ligand, with the resulting solution mixed with the nickel metal precursor, under reacting conditions to form a slurry (a gel or suspended precipitate). It should be understood that the catalyst precursor preparation is not limited to aqueous media, and the addition of the metal precursors/ligand can be in any order, and can be mixed separately or together with the optional ligand if present. In one embodiment, the reaction occurs at a temperature between 25-350° C. and at a pressure between 0 to 3000 psig. The pH of the reaction mixture can be changed to increase or decrease the rate of precipitation (cogel or cogellation).

After the co-precipitation step, the catalyst precursor is isolated or recovered in a liquid removal step using known separation processes such as filtering, decanting or centrifuging, then dried to further remove water. Binders (or diluents), pore forming agents, and other additives known in the art can be incorporated into the catalyst precursor before being optionally shaped by processes known in the art, e.g., extrusion, pelleting, or pilling. In one embodiment, the catalyst precursor is thermally treated or dried at a temperature between 50° C. to 200° C. for a hydroxide catalyst precursor. In another embodiment, the precursor is calcined at a temperature of at least 300° C. and preferably at least 325° C. after shaping In one embodiment, the catalyst precursor is prepared from nickel, molybdenum, and tungsten metal precursors in the form of organo-metallic compounds of nickel, molybdenum, and tungsten, as starting materials, in amounts sufficient to form a catalyst precursor containing nickel, molybdenum, and tungsten in the optimized compositional range. In another embodiment, the catalyst precursor is prepared by reacting at least a metal precursor, e.g., Ni, Mo, or W, with a single metal sulfide or a sulfide, e.g., nickel tungsten sulfides, nickel molybdenum sulfides, molybdenum tungsten sulfides etc., or a sulfur-containing metal compound such as Molyvan A, forming a catalyst precursor containing nickel, molybdenum, and tungsten in the optimized compositional range.

In one embodiment, the starting materials are first mixed in oxygen free solvent before the addition of sulfiding agents. Sulfiding agents such as dimethyl disulfide or carbon disulfide are added to the catalyst precursor to form the self-supported catalyst. Sulfiding reaction to form mixed metal sulfides in one embodiment occurs at a temperature between 200-450° C. and at a hydrogen pressure between 0-3000 psig.

The catalyst precursor can be sulfided under conditions sufficient to at least partially convert, and generally to substantially convert the components of the catalyst precursor into a metal sulfide. Suitable sulfiding conditions include heating the precursor in an atmosphere containing a sulfiding agent, e.g., $H_2S$, dimethyl disulfide, inorganic or organic polysulfides, etc., at a temperature ranging from 25° C. to 500° C., from 10 minutes to 15 days, and under a $H_2$-containing gas pressure. The sulfiding with a gaseous sulfiding agent such as $H_2S$ can be done ex-situ or in-situ, e.g., in the unit in which the catalyst will eventually be used for hydrotreating the hydrocarbon feeds.

Further details regarding methods for making the oxide or hydroxide catalyst precursor containing nickel, molybdenum and tungsten in the optimum compositional range, and sulfided catalyst formed from the oxide or hydroxide catalyst precursor thereof are described in a number of patent applications and patents, including U.S. Pat. No. 8,080,492, U.S. Pat. No. 8,058,203, U.S. Pat. No. 7,964,526, U.S. Pat. No. 7,931,799, U.S. Pat. No. 7,964,525, U.S. Pat. No. 7,544,285, U.S. Pat. No. 7,615,196, U.S. Pat. No. 6,635,599, U.S. Pat. No. 6,635,599, U.S. Pat. No. 6,652,738, U.S. Pat. No. 7,229,548, U.S. Pat. No. 7,288,182, U.S. Pat. No. 6,566,296, U.S. Pat. No. 6,860,987, U.S. Pat. No. 6,156,695, U.S. Pat. No. 6,162,350, U.S. Pat. No. 6,299,760, U.S. Pat. No. 6,620,313, U.S. Pat. No. 6,758,963, U.S. Pat. No. 6,783,663, U.S. Pat. No. 7,232,515, U.S. Pat. No. 7,179,366, U.S. Pat. No. 6,274,530; US Patent Publication Nos. US10110190557A1, US20090112011A1, US20090112010A1, US20090111686A1, US20090111685A1, US20090111683A1, US20090111682A1, US20090107889A1, US20090107886A1, US20090107883A1, US2007090024, the relevant disclosures with respect to the catalyst precursor and mixed metal sulfide catalyst composition are included herein by reference.

In one embodiment of a self-supported MMS catalyst containing molybdenum, tungsten, and nickel in an optimum compositional range is characterized as being multiphased, wherein the structure of the catalyst comprises five phases: a molybdenum sulfide phase, a tungsten sulfide phase, molybdenum tungsten sulfide phase, an active nickel phase, and a nickel sulfide phase. The molybdenum, tungsten and molybdenum tungsten sulfide phases comprise at least a layer, with the layer comprising at least one of: a) molybdenum sulfide and tungsten sulfide; b) tungsten isomorphously substituted into molybdenum sulfide either as individual atoms or as tungsten sulfide domains; c) molybdenum isomorphously substituted into tungsten sulfide either as individual atoms or as molybdenum sulfide domains; and d) mixtures of the aforementioned layers.

Figure 17:
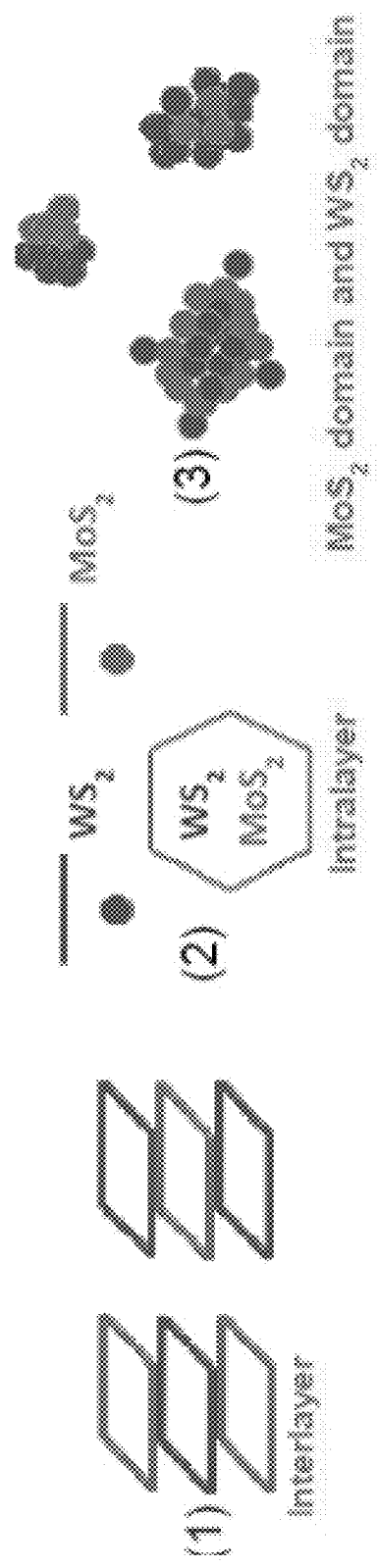
FIG. 17 is a pictorial representation of surface structure of the molybdenum tungsten sulfide phase in any form of: 1) intralayer atomic mixture; 2) inter-layer mixture of tungsten sulfide and molybdenum sulfide; and 3) a mixture of individual domains of tungsten sulfide and molybdenum sulfide.

In one embodiment, the number of layers ranges from 1-6. In one embodiment, the number of layers ranges from 1-6. In another embodiment as illustrated in FIG. 17, the molybdenum tungsten sulfide phase is present as tungsten atomically substituted into molybdenum sulfide layers (or vise versa), forming an intralayer atomic mixture. In another embodiment, the molybdenum tungsten sulfide phase is present as an inter-layer mixture of tungsten sulfide and molybdenum sulfide. In yet another embodiment, it is present as a mixture of individual domains of tungsten sulfide and molybdenum sulfide. The molybdenum tungsten sulfide phase can be observed via TEM or XRD.

The active nickel phase can be observed via TEM. The active nickel phase comprises: a) at least one of atomic nickel (e.g., in metallic state) and reduced nickel (e.g., nickel in an oxidation state lower than 2) substituted into the edge of molybdenum tungsten sulfide phase (for a tri-metallic catalyst) or tungsten sulfide phase (for a bi-metallic Ni:W catalyst), and b) $NiS_x$ nanoparticles ($0 \le x \le 1$) dispersed onto the molybdenum tungsten sulfide phase or decorating the edge of the molybdenum tungsten sulfide phase (for a tri-metallic catalyst) or tungsten sulfide phase (for a bi-metallic Ni:W catalyst).

The nickel sulfide phase comprises slabs of both $Ni_9S_8$ and $Ni_3S_2$ crystals. The large, nickel sulfide slabs serve as support for the growth of molybdenum tungsten sulfide (for a tri-metallic catalyst) or tungsten sulfide phase (for a bi-metallic Ni:W catalyst), and stabilize the dispersion of active nickel on the surface of molybdenum tungsten sulfide (for a tri-metallic catalyst) or tungsten sulfide (for a bi-metallic Ni:W catalyst).

SEM examination shows that the nickel sulfide phase comprises a plurality of slabs. XRD and TEM examination show that the nickel sulfide phase comprises at least one of $Ni_9S_8$ and $Ni_3S_2$. The large nickel sulfide crystalline slabs serve as support for the molybdenum tungsten sulfide and stabilize the dispersion of active nickel on the surface of molybdenum tungsten sulfide (for a tri-metallic catalyst) or tungsten sulfide (for a bi-metallic Ni:W catalyst).

Not wishing to be bound by any theory, it is believed that the molybdenum tungsten sulfide phase acts as a support for the active nickel phase. In turn, the nickel sulfide phase stabilizes the dispersion of the molybdenum tungsten sulfide phase. Molybdenum tungsten sulfide phase envelops the nickel sulfide slabs, so that the molybdenum tungsten sulfide layers exhibit a curved shape. Furthermore, the molybdenum tungsten sulfide phase develops defects in its lamellar crystalline structure on basal planes, creating special sites associated with increased HYL and/or HYD activity. The specific interactions of multiple phases result in a catalyst with enhanced HYD and HYL activities and with outstanding HDN and HDS performance. It should also be noted that different catalyst preparation routes, e.g. starting from decomposition of catalyst precursors in the form of organometallic compounds or co-precipitation of mixed metal oxohydroxide starting from oxygen-containing metal compounds may result in catalysts with a similar metal composition but different catalytic activities.

Figure 4:
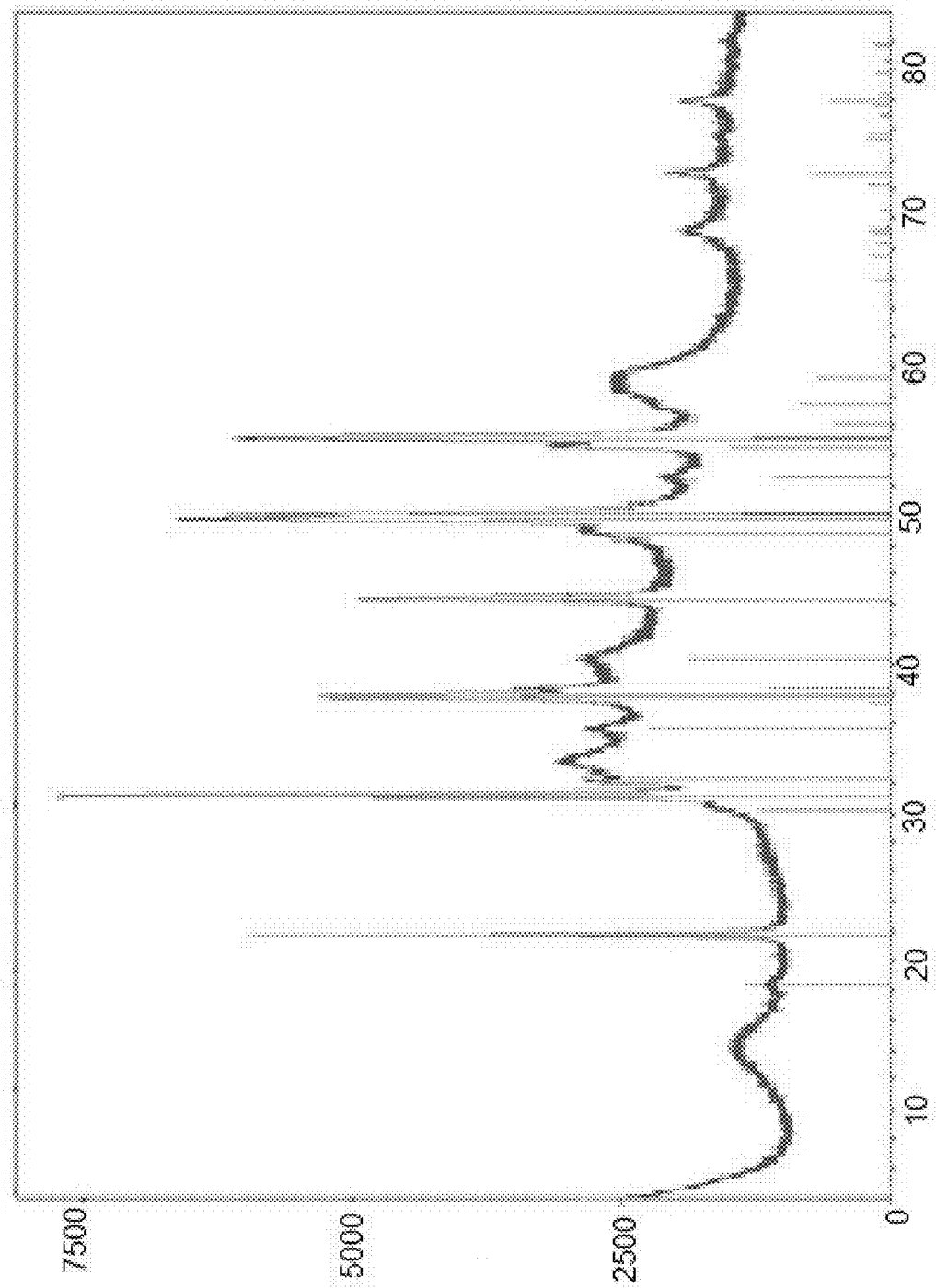
FIG. 4 is an image showing the XRD pattern (counts per second as a function of degrees 2 theta) of a spent catalyst having the composition within the optimum compositional range of 50 mol-% Ni, 25 mol-% Mo and 25 mol-% W.
Figure 5:
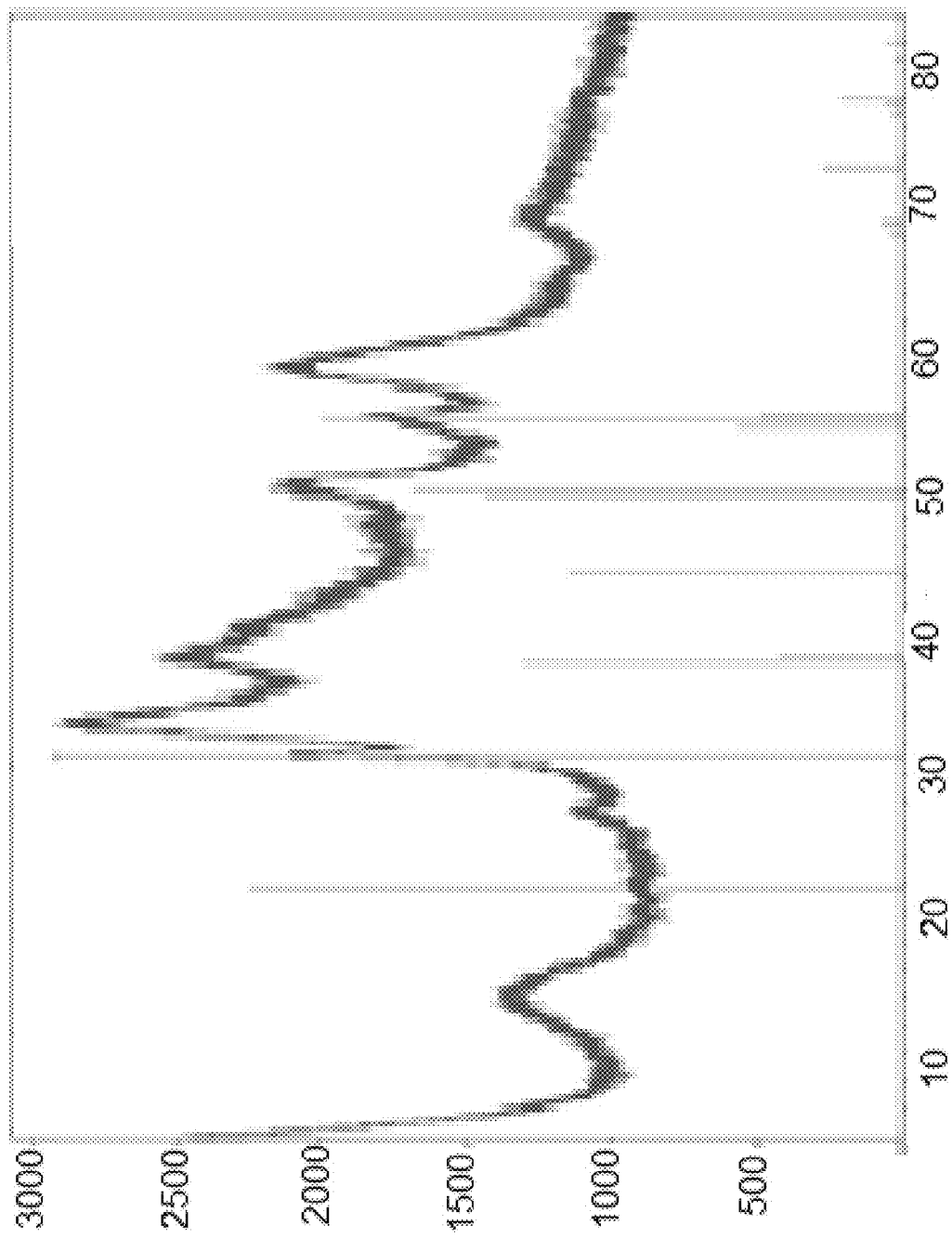
FIG. 5 is an image showing the XRD pattern (counts per second as a function of degrees 2 theta) of another spent catalyst having the composition within the optimum compositional range of 55 mol-% Ni, 14 mol-% Mo and 31 mol-% W.

In one embodiment, examination of the morphology of a self-supported catalyst tuned for optimum HYL and HYD activities with 50 mol-% Ni, 25 mol-% Mo and 25 mol-% W exhibits an XRD pattern containing peaks that are characteristic of $Ni_3S_2$ crystalline phase as illustrated in FIG. 4. As FIG. 4 illustrates, the XRD pattern exhibits reflection peaks indicative of the presence of molybdenum tungsten sulfide (according to international crystallographic database or ICDD), e.g., at 14.4°, 32.7°, 39.5°, 49.8° and 58.3° 2θ degree. In another embodiment as illustrated in FIG. 5, the XRD pattern exhibits reflection peaks corresponding to the presence of $Ni_3S_2$ phase (according to ICDD), e.g., at 21.8°, 31.1°, 37.8°, 44.3°, 49.7°, 50.1° and 55.2° 2θ degree.

Figure 7:
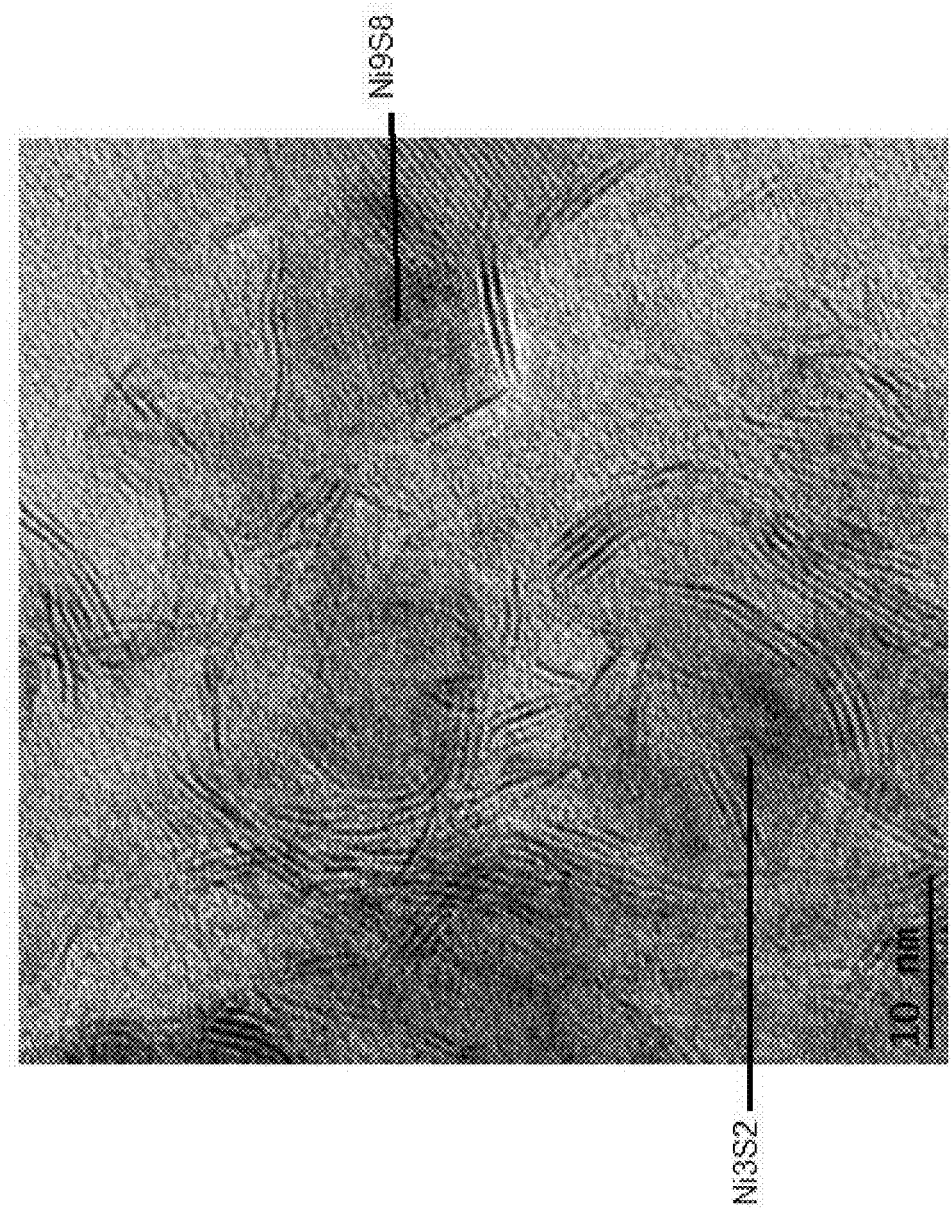
FIG. 7 is a TEM image showing crystalline $Ni_9S_8$ and $Ni_3S_2$ phases in the spent catalyst with a composition of 50 mol-% Ni, 25 mol-% Mo and 25 mol-% W.
Figure 8:
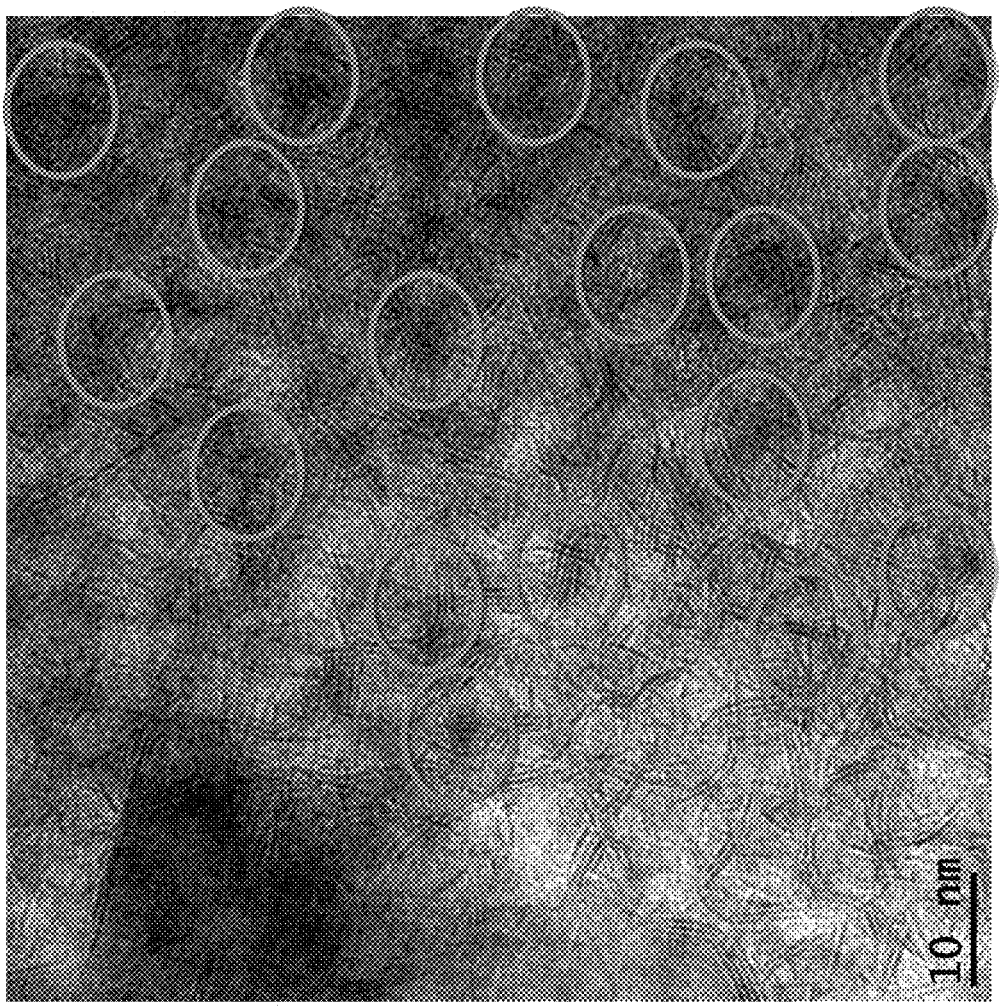
FIG. 8 is a TEM image showing nano-particles of nickel sulfide in the spent catalyst with composition of 50 mol-% Ni, 25 mol-% Mo and 25 mol-% W.

In one embodiment, TEM images of the nickel sulfide phase of a self-supported mixed metal sulfide catalyst within the optimum compositional range exhibit lattice fringes with 4.60±0.5 Å spacing, corresponding to the [002] plane of $Ni_9S_8$ and with 2.87 Å±0.5 Å spacing, corresponding to [110] plane of $Ni_3S_2$. These observations indicate that the nickel sulfide phases are crystalline. They further suggest that the nickel sulfide phase serves as nucleation site (support) for the growth of the molybdenum tungsten sulfide phase which stabilizes the active nickel dispersion. In another embodiment, TEM images suggest that active nickel in the form of $NiS_x$ nano-particles appear to be located on the molybdenum tungsten sulfide slabs or more likely decorating the edge of molybdenum tungsten sulfide slabs. FIG. 7 is an illustrative TEM image showing the presence of nickel sulfide as a combination of large crystals of $Ni_9S_8$ and $Ni_3S_2$. FIG. 8 is another illustrative TEM image, showing the presence of active nickel in the form of nano-particles of nickel sulfide.

XRD/TEM images illustrate how nickel sulfide supports molybdenum tungsten sulfide. Active nickel is in the form of $NiS_x$ nanoparticles dispersed onto the molybdenum tungsten sulfide and in the form of low-oxidation-state nickel substituted into molybdenum tungsten sulfide.

Figure 9:
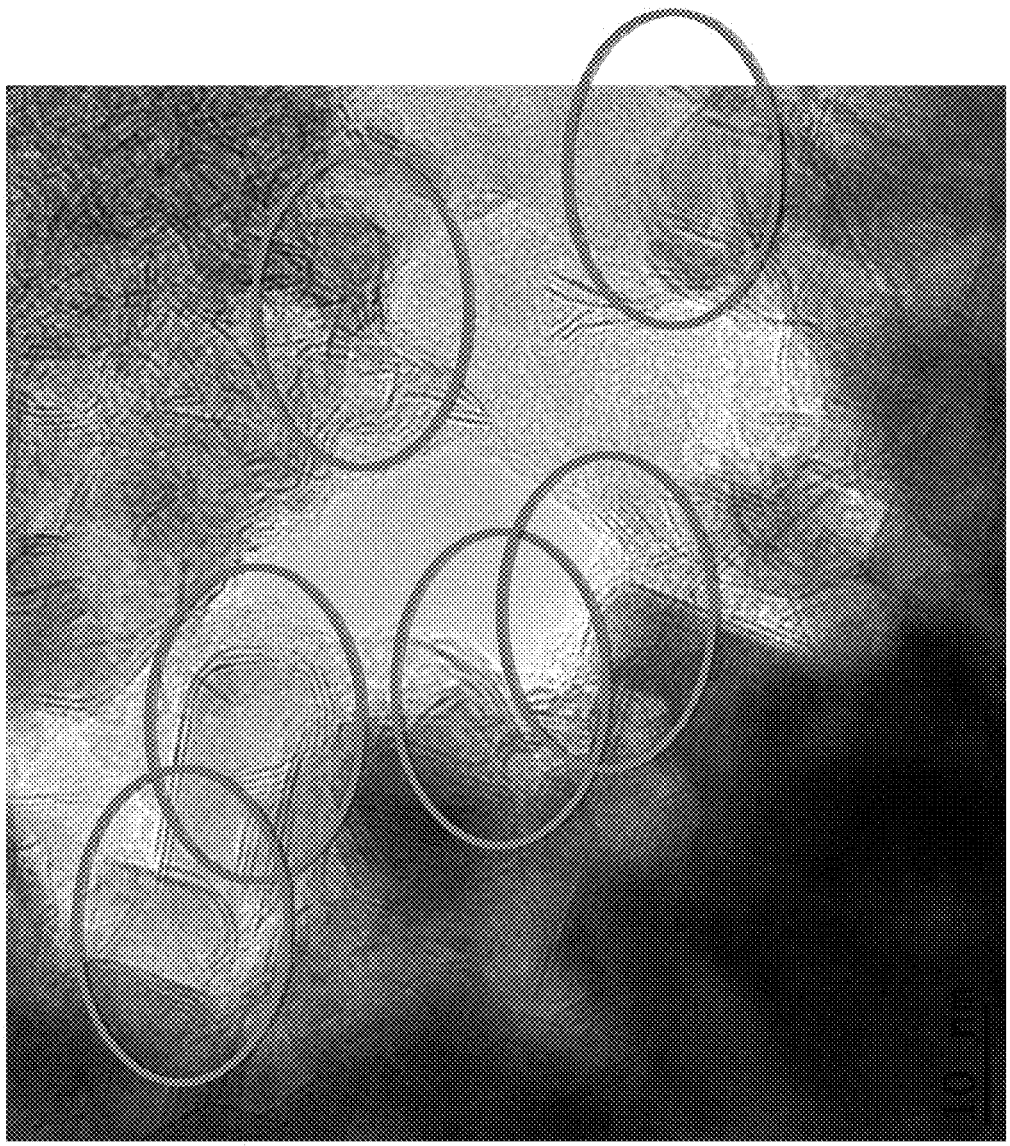
FIG. 9 is a TEM image of the spent catalyst with a composition of 50 mol-% Ni, 25 mol-% Mo and 25 mol-% W, showing curved multi-layer structure of molybdenum sulfide and tungsten sulfide particles.

FIG. 9 is another TEM image showing the presence of molybdenum tungsten sulfide particles, wherein the molybdenum tungsten sulfide particle curvature appears to follow the curvature of the nickel sulfide particle surface. The curvature in the molybdenum tungsten sulfide phase minimizes the height to which individual molybdenum tungsten particles can stack, and it decreases the size of the individual molybdenum tungsten sulfide particles. A curvature and a reduction of size and degree of stacking in molybdenum/tungsten sulfide particles leads to a higher density of sites active for HYD and HYL. In one embodiment, molybdenum/tungsten particles exhibit a stacking degree of 1-6 (layers) and a layer dimension of 30-50 Å, estimated by the Scherrer equation using the 2-4° FWHM (full width at half max) measured at 14° and 59° 2θ degree, respectively. The interplanar distance for the [002] plane is 6.1 Å.

Figure 16:
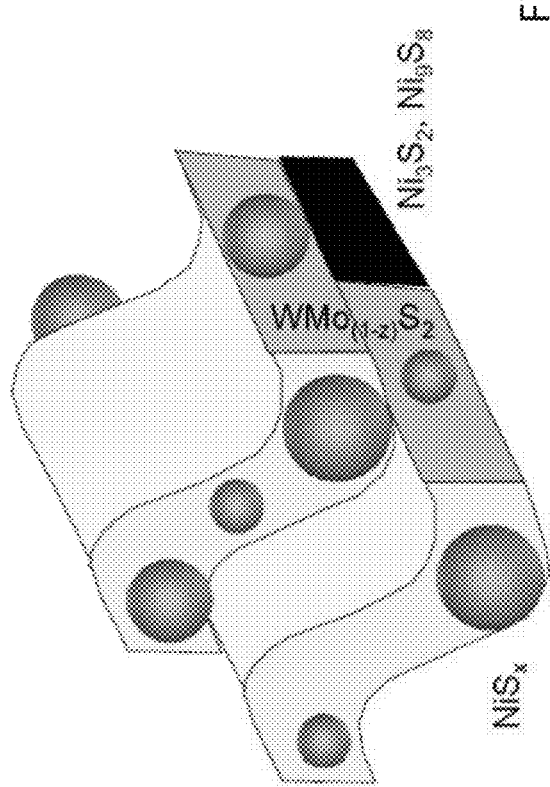
FIG. 16 is a pictorial representation of a TEM, showing 0.5-3 nm $NiS_x$ droplets on $WMo_{(1-z)}S_2$ layers.

FIG. 16 is a pictorial representation of a TEM image showing that at the optimum compositional range, the morphology mixed metal sulfides consist of large (about 10-20 nm in one embodiment) nickel sulfide slabs (Ni2S3 or Ni9S8), with molybdenum tungsten sulfide layers enveloping these nickel sulfide slabs. In the optimum compositional range, the molybdenum tungsten sulfide layers are arranged in stacks of about 1-4 layers with the majority of the layers being undulating. Active nickel sulfide (NiSx) droplets of varying size (1-20 nm) reside at the edges of the molybdenum tungsten sulfide layers.

Hydrotreating Applications:

The self-supported MMS catalysts containing molybdenum sulfide and tungsten sulfide in an amount of at least 0.1 mole % of Mo and 0.1 mole % of W have an HDS reaction rate constant of at least 10% higher in one embodiment, at least 15% higher in another embodiment, than a self-supported catalyst containing molybdenum sulfide alone, or a catalyst containing tungsten sulfide alone, when compared on the same metal weight basis in hydrotreating of a Heavy Coker Gas Oil as a feedstock at identical process conditions as indicated in Table E. In another embodiment, a molybdenum tungsten sulfide MMS catalyst exhibits an HYL reaction rate constant of at least 10% above the HYL reaction rate constant of a self-supported catalyst containing molybdenum sulfide alone, or a catalyst containing tungsten sulfide alone in hydrotreating a diphenylether, on the same metal molar basis at the process conditions as indicated in Table C.

The self-supported MMS catalysts containing nickel and tungsten sulfides within an optimum composition range have a high HYD activity and thereby outstanding HDN activities. Assuming first order kinetics, in one embodiment, the catalyst is characterized as having a HDN reaction rate constant of at least 4 hr$^{-1}$ on catalyst weight hourly space velocity basis in hydrotreating a Heavy Vacuum Gas Oil (VGO) at the steady state process conditions as indicated in Table F. In another embodiment, the HDN reaction constant is at least 4.5 hr$^{-1}$ on catalyst weight hourly space velocity basis. In another embodiment, the catalyst is characterized as having a HDN reaction rate constant of at least 100 g feed·hr$^{-1}$·g catalyst$^{-1}$ on hydrotreating a Heavy Coker Gas Oil under the process conditions indicated in Table E. In another embodiment, the catalyst is characterized as having a HDN reaction rate constant of at least 110 g feed·hr$^{-1}$·g catalyst$^{-1}$. A nickel tungsten sulfide MMS catalyst exhibits an HYD reaction rate constant of at least 10% in one embodiment, and at least 15% in another embodiment, above the HYD reaction rate constant of a self-supported catalyst containing tungsten sulfide alone, or a catalyst containing nickel sulfide alone in hydrotreating benzene on the same metal molar basis at the process conditions as indicated in Table D.

The self-supported MMS catalysts containing molybdenum, tungsten, and nickel sulfides within an optimum range have a uniquely combined high HYL activity of MMS catalysts containing molybdenum and tungsten sulfides, and high HYD activity of catalysts containing nickel and molybdenum sulfides or catalysts containing nickel and tungsten sulfides, and thereby outstanding HDN and HDS activities. In one embodiment, assuming the first order kinetics, the catalyst is characterized as having a HDN reaction rate constant of at least 4 hr$^{-1}$ on catalyst weight hourly space velocity basis, and a HDS reaction rate constant of at least 5 hr$^{-1}$ on catalyst weight hourly space velocity basis in hydrotreating a Heavy VGO at steady-state process conditions as indicated in Table F. In another embodiment, the HDN reaction constant at steady state conditions is at least 4.5 hr$^{-1}$ on catalyst weight hourly space velocity basis, and the HDS reaction rate constant is at least 6 hr$^{-1}$ on catalyst weight hourly space velocity basis. In another embodiment, the catalyst is characterized as having initial activity as expressed by a HDN reaction rate constant of at least 100 g feed·hr$^{-1}$·g catalyst$^{-1}$, and a HDS reaction rate constant of at least 550 g feed·hr$^{-1}$·g catalyst$^{-1}$ on hydrotreating a Heavy Coker Gas Oil at the process conditions as indicated in Table E. In another embodiment, the catalyst is characterized as having a HDN reaction rate constant of at least 110 g feed·hr$^{-1}$·g catalyst$^{-1}$ and a HDS reaction rate constant of at least 600 g feed·hr$^{-1}$·g catalyst$^{-1}$.

In one embodiment, the MMS catalyst containing molybdenum, tungsten, and nickel sulfides is characterized as having a HYD reaction rate constant and a HYL reaction rate constant of at least 10% higher than the respective rate constants of a catalyst containing nickel and molybdenum sulfides, or a catalyst containing nickel and tungsten sulfides, when compared on the same metal molar basis, in hydrotreating of a diphenylether as a feedstock at similar process conditions as indicated in Table C and Table D. In another embodiment, the HYD and HYL reaction rate constants are at least 15% higher.

The self-supported MMS catalysts having compositions within the optimum range and exhibiting combined high HYL and HYD activities are particularly suitable for hydrotreating refractory petroleum feeds such as heavy coker gas oils, LC Fining products, atmospheric residues (AR), vacuum gas oils (VGO), and particularly those derived from synthetic crudes. Refractory feeds are commonly characterized as exhibiting relatively high specific gravity, low hydrogen-to-carbon ratios, and high carbon residue. They contain significant amounts of asphaltenes, organic sulfur, organic nitrogen and metals, which increase hydrotreating difficulty and often results in the phase separation during aromatics hydrogenation. Such refractory feeds typically exhibit an initial boiling point in the range of 343° C. (650° F.) to 454° C. (850° F.), more particularly an initial boiling point above 371° C. (700° F.).

In one embodiment, the self-supported catalyst particularly suitable for the removal of high-boiling point sulfur species, including sulfur species boiling above 650° F. (343° C.), is used in the production of ultra-low sulfur diesel (ULSD) hydrocracker products, as well as in the production of naphtha acceptable as reformer feed.

EXAMPLES

The following illustrative examples are intended to be non-limiting. In the examples, either a model feed or a commercial feed was used with either organo metallic compounds or oxide/hydroxide precursors as starting reagents in preparation of mixed metal sulfide catalysts catalytic reactions were carried out in order to examine the activity of the catalysts containing combinations of active nickel, molybdenum and tungsten phases, so as to quantify the optimum ranges in terms of chemical compositions. The structure and composition of the MMS was determined using analytical techniques such as inductively coupled plasma (ICP) atomic emission spectroscopy (ICP AES), X-Ray Photoelectron Spectroscopy (XPS) and X-Ray Diffraction Analysis (XRD). Surface area was determined by BET (BET from Brunauer, Emmett, Teller) method using nitrogen adsorption isotherm measurements. Additional information on structural details and chemical composition of the mixed metal sulfide materials was obtained using Scanning Electron Microscopy (SEM) and transmission electron microscopy (TEM).

Hydrogenolysis activity of catalysts was determined by measuring the reaction rate of cleavage of $C(sp^2)$-O bond in diphenylether model feed as shown below. Reaction rate constant k1 is the rate constant of hydrogenolysis reaction of $C(sp^2)$-O-bond. There was no direct oxygen extrusion and partial hydrogenation detected.

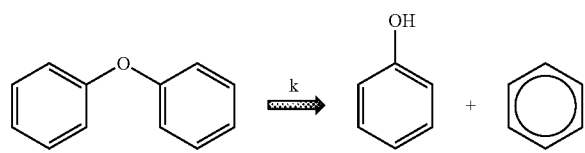

Hydrogenation activity was determined using the reaction rate of benzene model feed into cyclohexane, as shown below. Reaction rate constant k4 is the hydrogenation rate constant for the benzene to cyclohexane reaction:

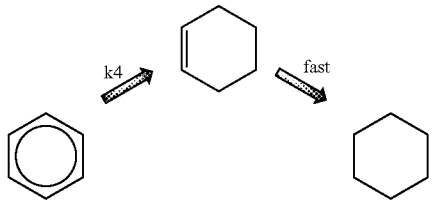

HYL/HYD Activity Evaluation Using Model Feeds:

In the examples that follow, HYL/HYD activities were evaluated using model feeds. The catalysts were prepared starting from organo-metallic compounds. After charging starting metal reagents, a sulfiding agent, model feed compounds and hexadecane, as a diluent, were added to a 1-L batch autoclave. The autoclave was sealed after purging with $H_2$ for 10 min. The reaction mixture was stirred at 750 rpm. The reactor was pre-pressurized to 1000 psig in $H_2$ at RT, followed by ramping to a reaction temperature of 382° C. (720° F.) in 2 hrs at a constant heating rate. After 30 min of reaction at 382° C. and 1800 psig, the reactor was quenched to below 100° C. in ~2 min with cold water. The reaction mixture was recovered from the reactor and filtered through 0.8 μm filter to collect a spent catalyst. After washing of the spent catalyst with sufficient amount of heptane, the catalyst was characterized using techniques including: ICP, XRD, XPS, BET, SEM and TEM.

The HYL reaction rate constant is defined as:

$$k_{HYL} = \ln\left(\frac{1}{1 - x(\text{diphenylether conversion})}\right) \times \frac{1}{\text{residence time}} \times \frac{1}{\text{mole of total catalyst metal}}$$

The HYD reaction rate constant is defined as:

$$k_{HYD} = \ln\left(\frac{1}{1 - x(\text{benzene conversion})}\right) \times \frac{1}{\text{residence time}} \times \frac{1}{\text{mole of total catalyst metal}}$$

HDS/HDN Activity Evaluation Using Refinery Feeds:

In a number of examples, HDS/HDN activities of catalysts were evaluated using refinery feeds. The catalysts were prepared from either organo-metallic compounds or hydroxide precursors. The refinery feeds were a Heavy Coker Gas Oil and a Heavy Vacuum Gas Oil.

The tests with Heavy Coker Gas Oil as the reactor feed were performed according to the following procedure. Metal containing starting reagents, sulfiding agents and hexadecane solvent were loaded into a 1-L batch autoclave. The autoclave was sealed after purging with $H_2$ for 10 min. The sulfiding reaction mixture was stirred at 750 rpm. The reactor was pre-pressurized to 1000 psig with $H_2$. The reaction temperature was ramped to 250° C. (480° F.) in 40 min and then was kept constant for 2.5 hrs, followed by a further temperature ramp to 343° C. (650° F.) in 70 min. After 2 hr at 343° C. the reactor was quenched with cold water to RT. Catalyst activity evaluation was carried out by hydrotreating a Heavy Coker Gas Oil. 120 g of heavy coker gas oil were charged into the autoclave containing a freshly prepared sulfide catalyst. The autoclave was sealed after purging with $H_2$ for 10 min. The reaction mixture was stirred at 750 rpm. The reactor was pressurized to 1000 psig with $H_2$ at room temperature (RT) followed by ramping to a reaction temperature of 382° C. (720° F.) in 2 hrs at a constant heating rate. After 30 min of reaction at 382° C. and 1800 psig, the reactor was quenched to below 100° C. in ~2 min with cold water. The reaction mixture was recovered from the reactor and filtered through 0.8 μm filter to collect a spent catalyst. After washing of the spent catalyst with sufficient amount of heptane, the catalyst was characterized using ICP, XRD, XPS, BET, SEM and TEM.

The HDS reaction rate constant is defined as:

$$k_{HDS} = \ln\left(\frac{1}{1 - x(HDS)}\right) \times \frac{1}{\text{residence time}} \times \frac{\text{gram of feed}}{\text{gram of catalyst}}$$

The conversion of HDS is between 30% and 67%.
The HDN reaction rate constant is defined as:

$$k_{HDN} = \ln\left(\frac{1}{1 - x(HDN)}\right) \times \frac{1}{\text{residence time}} \times \frac{\text{gram of feed}}{\text{gram of catalyst}}$$

The conversion of HDN is between 8% and 27%.

In examples describing the use of a Heavy Vacuum Gas Oil feed, a hydroxide catalyst precursor was ground to 20-40 mesh and loaded into a fixed bed reactor. Catalyst sulfiding was conducted following a liquid phase sulfiding procedure wherein a straight run diesel feed containing 2.5 wt % DMDS was used as a sulfiding agent. Sulfiding of the catalyst precursor occurred in two steps: a 400-500° F. low temperature sulfiding step followed by a 600-700° F. high temperature sulfiding. The reaction conditions for Heavy Vacuum Gas Oil hydrotreating were as follows: T=700° F., P=2300 psig, LHSV=2.0 hr$^{-1}$, once through hydrogen, H$_2$ to feed ratio=5000 scf/bbl.

The HDS reaction rate constant is defined as:

$$k_{HDS} = \ln\left(\frac{1}{1 - x(HDS)}\right) \times \frac{\text{liquid feed rate }\left(\frac{g}{hr}\right)}{\text{catalyst weight}}$$

The conversion of HDS is greater than 95% for all tested catalysts.

The HDN reaction rate constant is defined as:

$$k_{HDN} = \ln\left(\frac{1}{1 - x(HDN)}\right) \times \frac{\text{liquid feed rate }\left(\frac{g}{hr}\right)}{\text{catalyst weight}}$$

The conversion of HDN is greater than 95% for all tested catalysts.

Example 1

Experiments were carried out according to previously described procedures for the HYL/HYD activity evaluation of single component sulfide catalysts, e.g., nickel sulfide, molybdenum sulfide and tungsten sulfide. For the HYL activity evaluation, 0.93 g Molyvan A as a molybdenum source, or 0.83 g cyclopentadienyl tungsten dihydride as a tungsten source, or 2.57 g Ni naphthenate (6 wt % Ni in toluene) as a nickel source, was charged into 1-L batch autoclave together with reaction feed of 23.81 g diphenylether and 100 g hexadecane. No sulfiding agent was added to prepare a molybdenum sulfide catalyst. Carbon disulfide (CS$_2$) 0.4 g was added to sulfide tungsten into tungsten sulfide. 0.25 g of dimethyl disulfide (DMDS) was added to sulfide nickel into nickel sulfide. Spent catalyst samples were collected and characterized after reaction.

For the HYD activity evaluation, the experiments were repeated but with 5.46 g benzene and 100 g hexadecane as the reaction feed.

Table 1 lists hydrogenolysis and hydrogenation activities of the single metal catalysts Ni$_3$S$_2$, MoS$_2$, WS$_2$. Both activities are considered to be low.

TABLE 1

| Catalyst combination | Hydrogenolysis activity (hr$^{-1}$ mol$^{-1}$) × 10$^3$ | Hydrogenation activity (hr$^{-1}$ mol$^{-1}$) × 10$^2$ |
|---|---|---|
| MoS$_2$ | 0.8 | 1.0 |
| WS$_2$ | 0.9 | 1.4 |
| Ni$_3$S$_2$ | 0.2 | 0.2 |

Example 2

Experiments were carried out according to previously described procedures for the HDS/HDN activity evaluation of single component sulfide catalysts, e.g., nickel sulfide, molybdenum sulfide, tungsten sulfide in the hydrotreatment of a Heavy Coker Gas Oil feed. 0.93 g Molyvan A as molybdenum catalyst precursor; or 0.83 g cyclopentadienyl tungsten dihydride as tungsten catalyst precursor, or 2.57 g Ni naphthenate (6 wt % Ni in toluene) as nickel catalyst precursor, was charged into 1-L batch autoclave together with a reaction feed of 120 g of Heavy Coker Gas Oil and 100 g hexadecane. No sulfiding agent was added to prepare the molybdenum sulfide catalyst. 0.4 g of carbon disulfide (CS$_2$) was added to sulfide tungsten to prepare tungsten sulfide, 0.25 g of dimethyl disulfide (DMDS) was added to sulfide nickel to prepare nickel sulfide. Spent catalyst samples were collected and characterized after the reaction.

Table 2 lists the HDS and HDN activities of the single metal catalysts Ni$_3$S$_2$, MoS$_2$, WS$_2$. Both activities are considered to be weak.

TABLE 2

| Catalyst combination | Hydrogenolysis activity (hr$^{-1}$ mol$^{-1}$) × 10$^3$ | Hydrogenation activity (hr$^{-1}$ mol$^{-1}$) × 10$^2$ |
|---|---|---|
| MoS$_2$ | 0.8 | 1.0 |
| WS$_2$ | 0.9 | 1.4 |
| Ni$_3$S$_2$ | 0.2 | 0.2 |

Example 3

Experiments were carried out according to previously described procedures for HYL/HYD activity evaluations of molybdenum tungsten sulfide catalysts. For the HYL activity evaluation, Molyvan A and cyclopentadienyl tungsten dihydride at different ratios were charged into a 1-L batch autoclave together with a reaction feed of 23.81 g diphenylether, 100 g hexadecane and carbon disulfide (CS$_2$) sulfiding agent. The charge ratios were 0.62 g Molyvan A to 0.28 g cyclopentadienyl tungsten dihydride, and 0.31 g Molyvan A to 0.55 g cyclopentadienyl tungsten dihydride. These correspond to a Mo:W molar ratio of 2:1 and 1:2 respectively. Spent catalyst samples were collected and characterized after the reaction.

For the HYD activity evaluation, the experiments were repeated but with 5.46 g of benzene, 100 g of hexadecane as the reaction feed.

Table 3 lists the hydrogenolysis and hydrogenation activities of the molybdenum tungsten sulfide catalysts. There is a synergy between molybdenum sulfide and tungsten sulfide as demonstrated by the increased HYL activity, whereas HYD activity remains relatively low.

TABLE 3

| Catalyst combination (Ni, Mo,W mol-%) | CS$_2$ charge (g) | Hydrogenolysis activity (hr$^{-1}$ mol$^{-1}$) × 10$^3$ | Hydrogenation activity (hr$^{-1}$ mol$^{-1}$) × 10$^2$ |
|---|---|---|---|
| 0, 67, 33 | 0.25 | 1.1 | 0.4 |
| 0, 33, 67 | 0.5 | 1.3 | 0.5 |

Example 4

Experiments were carried out according to previously described procedures for HDS/HDN activity evaluation of molybdenum tungsten sulfide catalysts in the hydrotreatment of a Heavy Coker Gas Oil feedstock. 0.31 g of Molyvan A and 0.55 g of cyclopentadienyl tungsten dihydride were charged into a 1-L batch autoclave, together with a reaction feed of 120 g of Heavy Coker Gas Oil, 100 g of hexadecane and 0.5 g of carbon disulfide ($CS_2$) sulfiding agent. Spent catalyst samples were collected and characterized after the reaction.

Table 4 lists the HDS and HDN activities of the molybdenum tungsten sulfide catalysts. There is a synergy between molybdenum sulfide and tungsten sulfide, as demonstrated by the increased HDS activity, whereas HDN activity remains relatively low.

TABLE 4

| Catalyst combination (Ni, Mo,W mol-%) | HDS activity (g feed $hr^{-1}$/g catalyst) × $10^2$ | HDN activity (g feed $hr^{-1}$/g catalyst) × $10^2$ |
| --- | --- | --- |
| 0, 33, 67 | 3.6 | 0.5 |

Example 5

Experiments were carried out according to previously described procedures for HYL/HYD activity evaluations. For the HYL activity evaluation of a nickel molybdenum sulfide catalyst, 0.31 g Molyvan A and 1.71 g nickel naphthenate (6 wt % Ni in toluene) were charged into 1-L batch autoclave, together with a reaction feed of 23.81 g of diphenylether, 100 g of hexadecane and 0.17 g of dimethyl disulfide (DMDS) sulfiding agent. Spent catalyst samples were collected and characterized after the reaction.

For the HYD activity evaluation of the nickel molybdenum sulfide catalyst, the above experiment was repeated but with 5.46 g of benzene, 100 g of hexadecane as the reaction feed. Spent catalysts were collected and characterized after the reaction.

For the HYL evaluation of a nickel tungsten sulfide catalyst a combination of 0.28 g of cyclopentadienyl tungsten dihydride and 1.71 g of nickel naphthenate (6 wt % Ni in toluene) was charged into a 1-L batch autoclave together with reaction feed of 23.81 g of diphenylether, 100 g of hexadecane, and 0.17 g of dimethyl disulfide (DMDS) and 0.13 g of carbon disulfide ($CS_2$) sulfiding agents. Spent catalyst samples were collected and characterized after reactions.

For the HYD activity evaluation of the nickel tungsten sulfide catalyst combination, the above experiment was repeated but with 5.46 g of benzene, 100 g of hexadecane as the reaction feed. Spent catalysts were collected and characterized after reactions.

Table 5 shows the HYL and HYD activities of the nickel molybdenum sulfide and nickel tungsten sulfide catalysts. There is a synergy between nickel sulfide and molybdenum sulfide or nickel sulfide and tungsten sulfide, in promoting both HYL and HYD activities, in particular a strong HYD activity of the nickel tungsten sulfide catalyst.

TABLE 5

| Catalyst combination (Ni, Mo,W mol-%) | Hydrogenolysis activity ($hr^{-1}$ $mol^{-1}$) × $10^3$ | Hydrogenation activity ($hr^{-1}$ $mol^{-1}$) × $10^2$ |
| --- | --- | --- |
| 67, 33, 0 | 1.0 | 1.2 |
| 67, 0, 33 | 1.4 | 2.30 |

Example 6

Experiments were carried out according to previously described procedures for HDS/HDN activity evaluation of a nickel molybdenum sulfide catalyst and a nickel tungsten sulfide catalyst in the hydrotreatment of a Heavy Coker Gas Oil feed. For nickel molybdenum sulfide catalyst, 0.31 g of Molyvan A and 1.71 g of nickel naphthenate (6 wt % Ni in toluene) were charged into a 1-L batch autoclave together with a reaction feed of 120 g of Heavy Coker Gas Oil, 100 g of hexadecane and 0.17 g of dimethyl disulfide (DMDS) sulfiding agent. For nickel tungsten sulfide catalyst, 0.28 g of cyclopentadienyl tungsten dihydride and 1.71 g of nickel naphthenate (6 wt % Ni in toluene) were charged into a 1-L batch autoclave together with a reaction feed of 120 g of Heavy Coker Gas Oil, 100 g of hexadecane and 0.17 g of dimethyl disulfide (DMDS) and 0.13 g of carbon disulfide ($CS_2$) sulfiding agents. Spent catalyst samples were collected and characterized after reactions.

Table 6 summarizes the HDS and HDN activity data for the nickel molybdenum sulfide and nickel tungsten sulfide catalysts. There is a synergy between nickel sulfide and molybdenum sulfide and between nickel sulfide and tungsten sulfide in promoting both HDS and HDN activities, in particular a strong HDN activity of the nickel tungsten sulfide catalyst.

TABLE 6

| Catalyst combination (Ni, Mo, W mol-%) | HDS activity (g feed $hr^{-1}$/g catalyst) × $10^2$ | HDN activity (g feed $hr^{-1}$/g catalyst) × $10^2$ |
| --- | --- | --- |
| 67, 33, 0 | 5.9 | 1.2 |
| 67, 0, 33 | 6.0 | 1.5 |

Example 7

Experiments were carried out according to previously described procedures for HYL/HYD activity evaluation of a MMS catalyst containing nickel, molybdenum and tungsten sulfide. For the HYL evaluation, 0.23 g of Molyvan A, 0.21 g of cyclopentadienyl tungsten dihydride, and 1.28 g of nickel naphthenate (6 wt % Ni in toluene) as starting materials to prepare a MMS catalyst with 50 mol-% Ni, 25 mol-% Mo and 25 mol-% W were charged into a of 1-L batch autoclave together with a reaction feed of 23.81 g diphenylether, 100 g of hexadecane, 0.13 g of dimethyl disulfide (DMDS) and 0.10 g carbon disulfide ($CS_2$) sulfiding agents. Spent catalyst samples were collected and characterized after reactions.

For the HYD activity evaluation, the experiment was repeated but with a reaction feed of 5.46 g of benzene and 100 g of hexadecane. Spent catalysts were collected and characterized after reactions.

Table 7 lists hydrogenolysis and hydrogenation activity data for the MMS catalyst, showing very strong HYL and HYD activities.

TABLE 7

| Catalyst combination (Ni, Mo, W mol-%) | Hydrogenolysis activity ($hr^{-1}$ $mol^{-1}$) × $10^3$ | Hydrogenation activity ($hr^{-1}$ $mol^{-1}$) × $10^2$ |
| --- | --- | --- |
| 50, 25, 25 | 2.0 | 3.4 |

Example 8

Experiments were carried out according to previously described procedures for HDS/HDN activity evaluation of a MMS catalyst with 50 mol-% Ni, 25 mol-% Mo and 25 mol-% W in the hydrotreatment of a Heavy Coker Gas Oil feeds. Table 8 lists the HDS and HDN activity data for the MMS catalyst, showing very strong HDS and HDN activities of the MMS catalyst at the selected ratio.

TABLE 8

| Catalyst combination (Ni, Mo, W mol-%) | HDS activity (g feed hr$^{-1}$/g catalyst) × 10$^2$ | HDN activity (g feed hr$^{-1}$/g catalyst) × 10$^2$ |
|---|---|---|
| 50, 25, 25 | 6.2 | 1.3 |

Example 9

Experiments were carried out according to previously described procedures for HYL/HYD activity evaluation of different MMS catalysts of different transition metal compositions. In one experiment, 0.13 g of Molyvan A, 0.26 g of cyclopentadienyl tungsten dihydride, 1.42 g of nickel naphthenate (6 wt % Ni in toluene) were charged into a 1-L batch autoclave together with a reaction feed of 23.81 g of diphenylether for HYL evaluation or 5.46 g of benzene for HYD evaluation, 100 g hexadecane, 0.14 g of DMDS and 0.13 g of carbon disulfide (CS$_2$). A target catalyst composition of a MMS catalyst was 55 mol-% Ni, 14 mol-% Mo and 31 mol-% W.

Table 9 lists the HYL and HYD activity data for the MMS catalyst showing o that HYL and HYD activities can be optimized by changing the catalyst composition.

TABLE 9

| Catalyst combination (Ni, Mo, W mol-%) | Hydrogenolysis activity (hr$^{-1}$ mol$^{-1}$) × 10$^3$ | Hydrogenation activity (hr$^{-1}$ mol$^{-1}$) × 10$^2$ |
|---|---|---|
| 55, 14, 31 | 1.9 | 3.4 |

Example 10

Experiments were carried out according to previously described procedures for HDS/HDN activity evaluation of different MMS catalysts with different metal compositions in hydrotreatment of a Heavy Coker Gas Oil feed. The amounts of starting materials used in catalysts preparations and catalyst activity evaluation results are as shown in Tables 10 and 11. The results indicate that HDS and HDN activities of MMS catalysts correlate strongly with the catalyst composition and there is arrange of optimum transition metal ratios where the catalyst activity is the highest. In the tables, Molyvan A is the Mo starting reagent; cyclopentadienyl tungsten dihydride is the W starting reagent; Ni naphthenate (6 wt % Ni in toluene) is the Ni starting reagent.

TABLE 10

| Catalyst combination (Ni, Mo, W mol-%) | HDS × 10$^2$ (g feed hr$^{-1}$/g catalyst) | Molyvan A weight (g) | cyclopentadienyl tungsten dihydride weight (g) | nickel naphthenate weight (g) | DMDS weight (g) | CS$_2$ weight (g) |
|---|---|---|---|---|---|---|
| 55, 14, 31 | 5.8 | 0.13 | 0.26 | 1.42 | 0.27 | 0.12 |
| 55, 15, 30 | 7.5 | 0.14 | 0.25 | 1.40 | 0.14 | 0.12 |
| 56, 15, 29 | 6.9 | 0.14 | 0.25 | 1.43 | 0.14 | 0.12 |
| 58, 11, 31 | 5.5 | 0.10 | 0.26 | 1.49 | 0.15 | 0.13 |
| 58, 14, 28 | 7.9 | 0.13 | 0.23 | 1.49 | 0.14 | 0.11 |
| 60, 13, 27 | 7.3 | 0.12 | 0.22 | 1.54 | 0.15 | 0.11 |

TABLE 11

| Catalyst (Ni, Mo, W mol-%) | HDN × 10$^2$ (g feed hr$^{-1}$/g catalyst) | Molyvan A weight (g) | cyclopentadienyl tungsten dihydride weight (g) | nickel naphthenate weight (g) | DMDS weight (g) | CS$_2$ weight (g) |
|---|---|---|---|---|---|---|
| 55, 14, 31 | 1.3 | 0.13 | 0.26 | 1.42 | 0.14 | 0.12 |
| 55, 15, 30 | 1.1 | 0.14 | 0.25 | 1.40 | 0.14 | 0.12 |
| 56, 15, 29 | 1.8 | 0.14 | 0.25 | 1.43 | 0.14 | 0.12 |
| 58, 11, 31 | 1.5 | 0.10 | 0.26 | 1.49 | 0.15 | 0.13 |
| 58, 14, 28 | 1.2 | 0.13 | 0.23 | 1.49 | 0.14 | 0.11 |
| 60, 13, 27 | 1.5 | 0.12 | 0.22 | 1.54 | 0.15 | 0.11 |

Example 11

Experiments were carried out according to previously described procedures for HYL/HYD activity evaluation of different MMS catalysts with different transition metal mol-percentages outside the optimal metal range. The results of activity evaluations and amounts of starting materials used in catalyst preparations are as shown in Table 12 and 13. The results indicate that for catalysts compositions outside of the optimum range the HYD and HYL activities are reduced.

TABLE 12

| Catalyst combination (Ni, Mo, W mol-%) | HYL × 10³ (hr⁻¹ mol⁻¹) | Molyvan A weight (g) | cyclopentadienyl tungsten dihydride weight (g) | nickel naphthenate weight (g) | DMDS weight (g) | CS₂ weight (g) |
|---|---|---|---|---|---|---|
| 20, 40, 40 | 1.1 | 0.38 | 0.33 | 0.51 | 0.05 | 0.16 |
| 33, 33, 34 | 1.0 | 0.31 | 0.28 | 0.86 | 0.09 | 0.13 |
| 55, 31, 14 | 1.1 | 0.29 | 0.11 | 1.42 | 0.14 | 0.06 |

TABLE 13

| Catalyst combination (Ni, Mo, W mol-%) | HYD × 10² (hr⁻¹ mol⁻¹) | Molyvan A weight (g) | cyclopentadienyl tungsten dihydride weight (g) | nickel naphthenate weight (g) | DMDS weight (g) | CS₂ weight (g) |
|---|---|---|---|---|---|---|
| 20, 40, 40 | 1.6 | 0.38 | 0.33 | 0.51 | 0.05 | 0.16 |
| 33, 33, 34 | 1.6 | 0.31 | 0.28 | 0.86 | 0.09 | 0.13 |
| 55, 31, 14 | 1.1 | 0.29 | 0.11 | 1.42 | 0.14 | 0.06 |

Example 12

Experiments were carried out according to previously described procedures for HDS/HDN activity evaluation of different MMS catalysts with different transition metal mol-percentages in hydrotreatment of a Heavy Coker Gas Oil feed. The activity test results and amounts of starting materials used in catalysts preparations are as shown in Table 14 and 15. The results indicate that for catalysts compositions outside of the optimum range, the HYD and HYL activities are reduced.

TABLE 14

| Catalyst combination (Ni, Mo, W mol-%) | HDS × 10² (g feed hr⁻¹/g catalyst) | Molyvan A weight (g) | cyclopentadienyl tungsten dihydride weight (g) | nickel naphthenate weight (g) | DMDS weight (g) | CS₂ weight (g) |
|---|---|---|---|---|---|---|
| 9:45.5:45.5 | 3.9 | 0.42 | 0.38 | 0.23 | 0.04 | 0.18 |
| 10:10:80 | 4.0 | 0.09 | 0.66 | 0.26 | 0.05 | 0.32 |
| 20:40:40 | 3.5 | 0.37 | 0.33 | 0.51 | 0.10 | 0.16 |
| 20:10:70 | 4.8 | 0.09 | 0.58 | 0.51 | 0.10 | 0.28 |
| 33:33:34 | 5.0 | 0.31 | 0.28 | 0.86 | 0.16 | 0.13 |

TABLE 15

| Catalyst combination (Ni, Mo, W mol-%) | HDN × 10² (g feed hr⁻¹/g catalyst) | Molyvan A weight (g) | cyclopentadienyl tungsten dihydride weight (g) | nickel naphthenate weight (g) | DMDS weight (g) | CS₂ weight (g) |
|---|---|---|---|---|---|---|
| 9:45.5:45.5 | 0.8 | 0.42 | 0.38 | 0.23 | 0.04 | 0.18 |
| 10:10:80 | 1.0 | 0.09 | 0.66 | 0.26 | 0.05 | 0.32 |
| 20:10:70 | 1.0 | 0.09 | 0.58 | 0.51 | 0.10 | 0.28 |
| 20:40:40 | 0.9 | 0.37 | 0.33 | 0.51 | 0.10 | 0.16 |
| 27:59:15 | 1.0 | 0.55 | 0.12 | 0.69 | 0.13 | 0.06 |
| 33:33:34 | 1.0 | 0.31 | 0.28 | 0.86 | 0.16 | 0.13 |

Example 13

In this experiment a MMS catalyst was prepared using a hydroxide catalyst precursor containing 55 mol-% Ni, 14 mol-% Mo and 31 mol-% W. To prepare the hydroxide catalyst precursor, $Ni(NO_3)_2 \cdot 6H_2O$, $(NH_4)_6(Mo_7O_{24}) \cdot 4H_2O$ and $(NH_4)_6H_2W_{12}O_{40}$ were dissolved into water and co-precipitated by adding $NH_4OH$ according to the procedure known in the art, e.g., Encyclopedia of Catalysis, for the co-precipitation reactions of metal precursors.

0.353 g (on dry basis) of the catalyst precursor was charged into a 1-L batch autoclave together with 100 g of hexadecane and 0.25 g of carbon disulfide ($CS_2$) sulfiding agent. During catalyst sulfiding, the reactor was sealed after purging in $H_2$ for 10 min. The reaction mixture was mixed at 750 rpm. The reactor was pre-pressurized to 1000 psig in $H_2$ followed by ramping to 250° C. (480° F.) in 40 min. After reaction at the temperature for 2.5 hrs, the reactor temperature was further ramped up to 343° C. (650° F.) in 70 min followed by 2 hr reaction. The sulfiding mixture was then quenched to RT.

Example 14

Experiments were carried out for HYL/HYD activity evaluation of the sulfided catalyst prepared from the catalyst precursor of Example 13.

For HYL activity evaluation, 23.81 g of diphenylether was charged at room temperature (RT) into the reactor containing the sulfided catalyst. The reactor was sealed after purging in H$_2$ for 10 min. The reaction mixture was mixed at 750 rpm. The reactor was pressurized to 1000 psig in H$_2$ at RT followed by ramping to a reaction temperature of 382° C. (720° F.) in 2 hrs at a constant heating rate. The reactor pressure at the reaction temperature was kept at ~1800 psig. After reacting for ½ hr at 382° C., the reactor was quenched to below 100° C. in ~2 min by circulating cooling water. The reaction mixture was recovered from the reactor and filtered through 0.8 μm filter paper to collect a spent catalyst for analysis/characterization.

For the HYD activity evaluation, the above experiment was repeated but with 5.46 g of benzene as the reaction feed. The spent catalyst was collected and characterized after reactions.

Table 16 shows the HDS and HDN activity data for the MMS catalyst prepared from a hydroxide catalyst precursor. The data confirm that in the optimum compositional range HDS and HDN activities are the highest.

TABLE 16

| Ni, Mo, W (mol-%) | HYL activity (hr$^{-1}$ mol$^{-1}$) × 10$^3$ | HYD activity (hr$^{-1}$ mol$^{-1}$) × 10$^2$ |
| --- | --- | --- |
| 55, 14, 31 | 1.6 | 2.6 |

Example 15

Experiments were carried out for HDS/HDN activity evaluation of the sulfided catalyst prepared from the catalyst precursor of Example 13. For the evaluation, 120 g of Heavy Coker Gas Oil feed was charged at RT into the reactor containing the sulfided catalyst. The reactor was sealed after purging in H$_2$ for 10 min. The reaction mixture was mixed at 750 rpm. The reactor was pressurized to 1000 psig in H$_2$ at RT followed by ramping to a reaction temperature of 382° C. (720° F.) in 2 hrs at a constant heating rate. The reactor pressure at the reaction temperature was ~1800 psig. After reacting for ½ hr at 382° C., the reactor was quenched to below 100° C. in ~2 min by circulating cooling water. The reaction mixture was recovered from the reactor and filtered through 0.8 μm filter paper to collect spent catalyst for analyses and characterization. It was noted that the surface area of the spent catalyst was only about half of the catalyst prepared from an organometallic starting material (e.g., Molyvan A, cyclopentadienyl tungsten dihydride, and nickel naphthenate). For a fair comparison, HDS and HDN activities were normalized by surface area and Ni surface/bulk concentration ratio. The results shown in Table 17 provide a comparison of the MMS catalyst prepared from a hydroxide catalyst precursor of Example 13 to the MMS catalyst prepared from organo-metallic starting materials of a similar composition (55 mol-% Ni, 14 mol-% Mo and 31 mol-% W.

Example 16

Experiments were carried out according to previously described procedures for HDS/HDN activity evaluation of different MMS catalysts with different transition metal percentages in hydrotreating of a Heavy Vacuum Gas Oil feed. A hydroxide catalyst precursor prepared using the method in the Example 13 was sulfided in a fixed bed reactor following the previously described procedure. The activity test results are as shown in Tables 18. For the catalysts having compositions within the optimum range, the HDN and HDS activities are the highest. The HDN and HDS reaction rate constants were calculated assuming first order kinetics on liquid weight hourly space velocity (LHSV) basis.

TABLE 18

| Catalyst combination (Ni, Mo, W mol-%) | HDS activity (hr$^{-1}$) | HDN activity on (hr$^{-1}$) |
| --- | --- | --- |
| 46, 8, 46 | 7.5 | Nitrogen below detection |
| 52, 14, 34 | 7.2 | 11.4 |
| 55, 5, 40 | 8.6 | 7.3 |
| 56, 9, 35 | 8.5 | nitrogen below detection |
| 58, 5, 37 | 10.6 | 8.9 |
| 59, 8, 33 | 9.0 | nitrogen below detection |
| 59, 7, 34 | 9.0 | nitrogen below detection |
| 61, 6, 33 | 8.5 | nitrogen below detection |
| 64, 8, 28 | 9.0 | 8.2 |
| 65, 7, 28 | 10.0 | Nitrogen below detection |
| 70, 7, 23 | 8.3 | 8.1 |

Example 17

Experiments were carried out according to previously described procedures for HDS/HDN activity evaluation of different MMS catalysts with different transition metal percentages in hydrotreating of a Heavy Vacuum Gas Oil feed. A hydroxide catalyst precursor prepared using the method in the Example 13 was sulfided in a fixed bed reactor following previously described procedure. The results, as shown in Table 19, indicate relatively low HDN activities for MMS catalysts with compositions outside the optimal transition metal range. The HDS and HDN reaction rate constants were calculated assuming first order kinetics on liquid weight hourly space velocity (LHSV) basis.

TABLE 19

| Catalyst combination (Ni, Mo, W mol-%) | HDS activity (hr$^{-1}$) | HDN activity (hr$^{-1}$) |
| --- | --- | --- |
| 78, 11, 11 | 5.1 | 3.5 |
| 67, 20, 13 | 5.6 | 2.8 |
| 68, 23, 9 | 6.1 | 4.0 |

TABLE 17

| Catalyst type | Surface area m$^2$/g | Ni surface/bulk concentration ratio | HDS activity (g feed hr$^{-1}$/g catalyst) × 10$^2$ | HDN activity g feed hr$^{-1}$/g catalyst) × 10$^2$ | Normalized HDS activity (g feed hr$^{-1}$ m$^{-2}$) | Normalized HDN activity (g feed hr$^{-1}$ m$^{-2}$) |
| --- | --- | --- | --- | --- | --- | --- |
| Example 13 | 40 | 0.80 | 3.3 | 0.8 | 10.3 | 2.5 |
| Organo-metallic feed | 74 | 0.77 | 5.8 | 1.3 | 10.2 | 2.3 |

Example 18

Experiments were carried out according to previously described procedures for HDS/HDN activity evaluation of different MMS catalysts with different transition metal percentages in hydrotreating of a Heavy Vacuum Gas Oil feed. A hydroxide catalyst precursor prepared using the method in the Example 13 was sulfided in a fixed bed reactor following the previously described procedure. The activity test results are as shown in Table 20. Nickel/tungsten bimetallic catalyst has high hydrogenation activity:

TABLE 20

| Catalyst combination (Ni, Mo, W mol-%) | HDS activity (hr$^{-1}$) | HDN activity (hr$^{-1}$) |
| --- | --- | --- |
| 50:0:50 | 7.34 | Nitrogen below detection |

Example 19

Experiments were carried out according to previously described procedures for HDS/HDN activity evaluation of different MMS catalysts with different transition metal percentages in hydrotreating of a Heavy Vacuum Gas Oil feed. A hydroxide catalyst precursor prepared using the method in the Example 13 was sulfided in a fixed bed reactor following the previously described procedure. The activity test results are as shown in Table 21. Nickel/molybdenum bimetallic catalyst has relatively poor hydrogenation activity.

TABLE 21

| Catalyst combination (Ni, Mo, W mol-%) | HDS activity (hr$^{-1}$) | HDN activity (hr$^{-1}$) |
| --- | --- | --- |
| 52, 48, 0 | 5.6 | 4.0 |
| 69, 31, 0 | 6.1 | 4.1 |

Example 20

The spent catalysts from the previous Examples were characterized by XRD and TEM.

Figure 6:
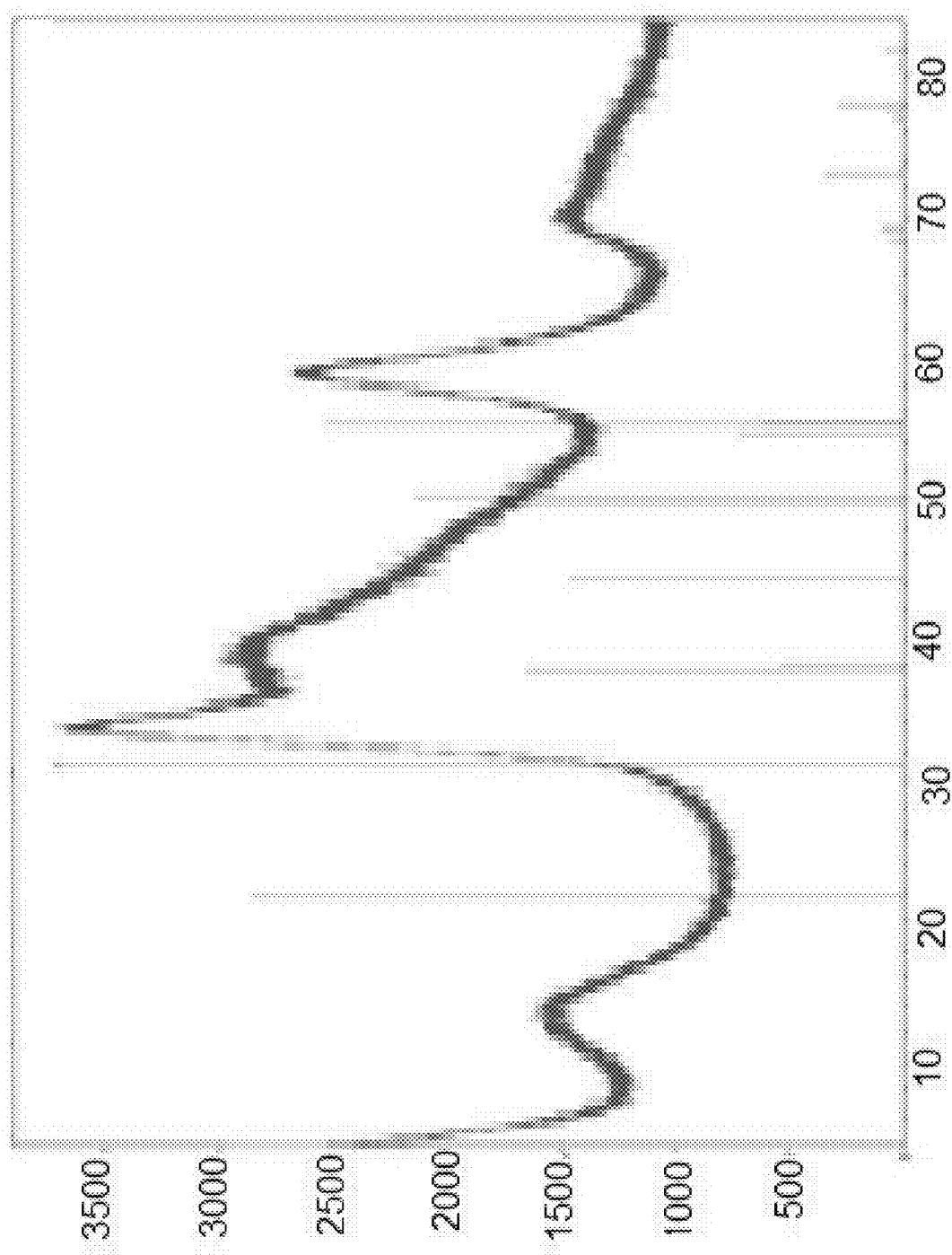
FIG. 6 is an image showing the XRD pattern (counts per second as a function of degree 2 theta) of a spent catalyst with composition of 10 mol-% Ni, 45 mol-% Mo and 45 mol-% W.

FIG. 4 shows the XRD pattern of a spent catalyst with 50 mol-% Ni, 25 mol-% Mo and 25 mol-% W, and FIG. 5 shows the XRD pattern of the spent MMS catalyst with 55 mol-% Ni, 14 mol-% Mo and 31 mol-% W, with peaks corresponding to the crystalline $Ni_3S_2$ phase. FIG. 6 shows the XRD pattern of a spent MMS catalyst with a sub-optimal composition (10 mol-% Ni, 45 mol-% Mo and 45 mol-% W.

Figure 10:
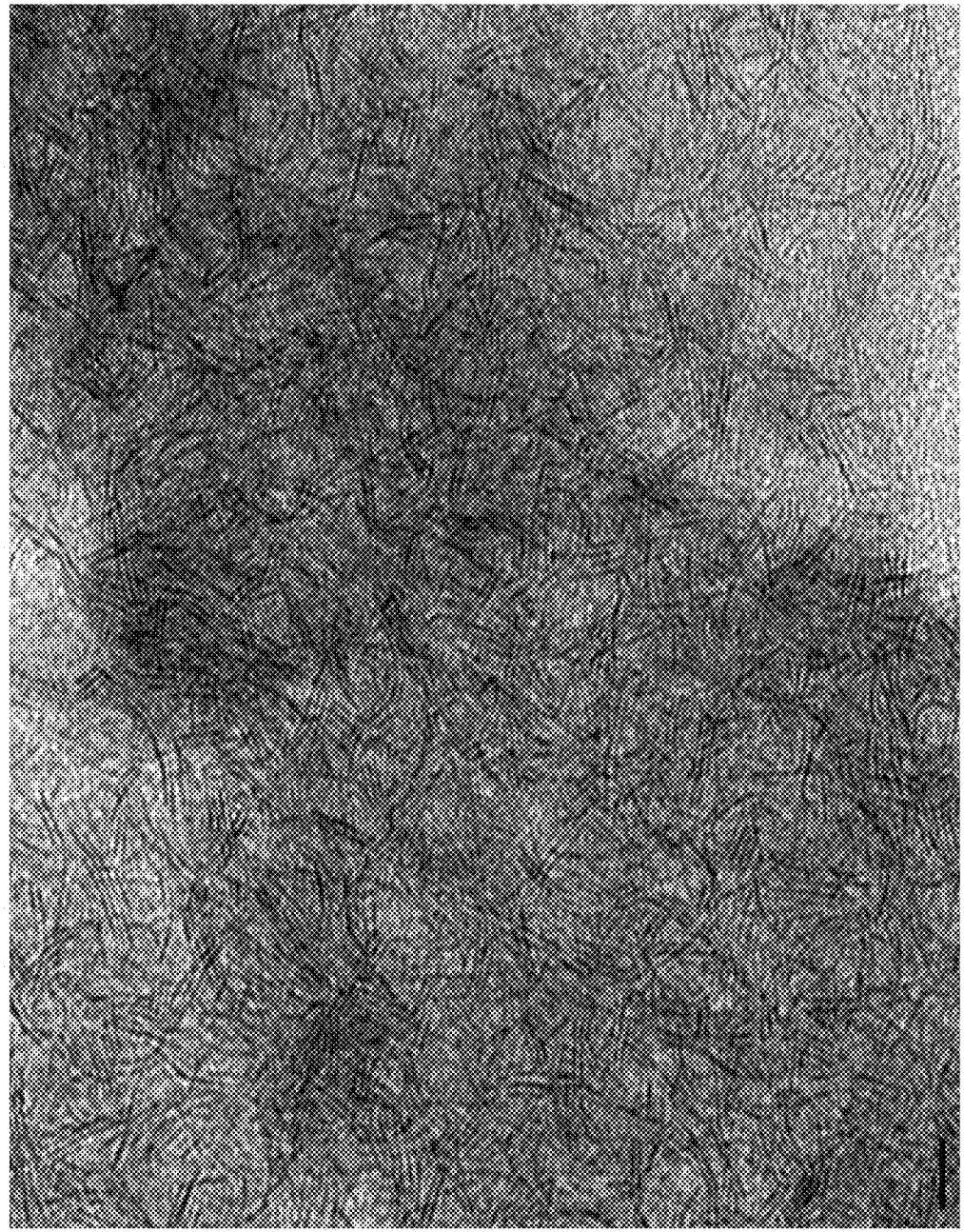
FIG. 10 is a TEM image of a spent catalyst with composition of 10 mol-% Ni, 45 mol-% Mo and 45 mol-% W.

FIG. 7 shows the TEM image of the spent MMS catalyst with 50 mol-% Ni, 25 mol-% Mo and 25 mol-% W. The image clearly shows the presence of large crystalline $Ni_9S_8$ and $Ni_3S_2$. FIG. 8 is another TEM image of this spent MMS catalyst, showing nano-particles of nickel sulfide. FIG. 9 is a TEM image of this spent MMS catalyst, showing that molybdenum tungsten sulfide envelops the nickel sulfide consisting predominantly of $Ni_3S_2$ in this particular case. The curvature of molybdenum tungsten sulfide layers conforms to that of the nickel sulfide particle. FIG. 10 is a TEM image of a spent MMS catalyst with a composition outside the optimum range (10 mol-% Ni, 45 mol-% Mo and 45 mol-% W) There is no detectable $Ni_3S_2$ in the image.

Tables 22 and 23 show the stacking degree data for nickel molybdenum sulfide particles, nickel tungsten sulfide particles, and nickel molybdenum tungsten sulfide particles as well as size of slabs The stacking degree and particle dimensions are estimated by Scherrer equation using FWHM at 14.4° and 58.3° respectively. For a nickel molybdenum sulfide catalyst without tungsten, the stacking degree increased from 4 to 8 by increasing the nickel-to-molybdenum ratio from 0.2 to 4.4. By contrast, for MMS catalysts that contain tungsten, the stacking degree remained at ~3-5 and the individual slab sizes remained at about 30-45 Å in a wide compositional range. The results illustrate the impact of tungsten on the structure of MMS catalysts.

TABLE 22

| Ni, Mo, W (mol-%) | Stacking degree | [110] dimension (Å) | Ni, Mo, W (mol-%) | Stacking degree | [110] dimension (Å) |
| --- | --- | --- | --- | --- | --- |
| 17, 83, 0 | 4.2 | 37.3 | 17, 0, 83 | 4.3 | 32.1 |
| 50, 50, 0 | 3.9 | 42.7 | 50, 0, 50 | 3.9 | 37.7 |
| 64, 36, 0 | 5.3 | 40.3 | 64, 0, 36 | 3.9 | 36.3 |
| 81, 19, 0 | 8.4 | 59.7 | 81, 0, 19 | 5.1 | 43.9 |

TABLE 23

| Ni, Mo, W (mol-%) | Stacking degree | [110] dimension (Å) | Ni, Mo, W (mol-%) | Stacking degree | [110] dimension (Å) |
| --- | --- | --- | --- | --- | --- |
| 10, 45, 45 | 3.2 | 33.7 | 60:20:20 | 4.8 | 43.3 |
| 20, 40, 40 | 3.5 | 36.1 | 64, 17, 17 | 4.9 | 42.2 |
| 33, 33, 33 | 4.4 | 40.8 | 55:14:31 | 4.1 | 44.7 |
| 50, 25, 25 | 4.5 | 42.2 | 55:31:14 | 4.6 | 45.3 |

Example 21

XPS data of the spent catalysts from the previous Examples were analyzed to determine the Ni, Mo and W surface concentration at various bulk nickel, molybdenum and tungsten concentrations. It is believed that within the optimal metal composition range, the catalyst surface is enriched with W. In addition, the presence of tungsten in molybdenum tungsten sulfide promotes the dispersion of $NiS_x$ nano-particles on the surface.

Figure 11:
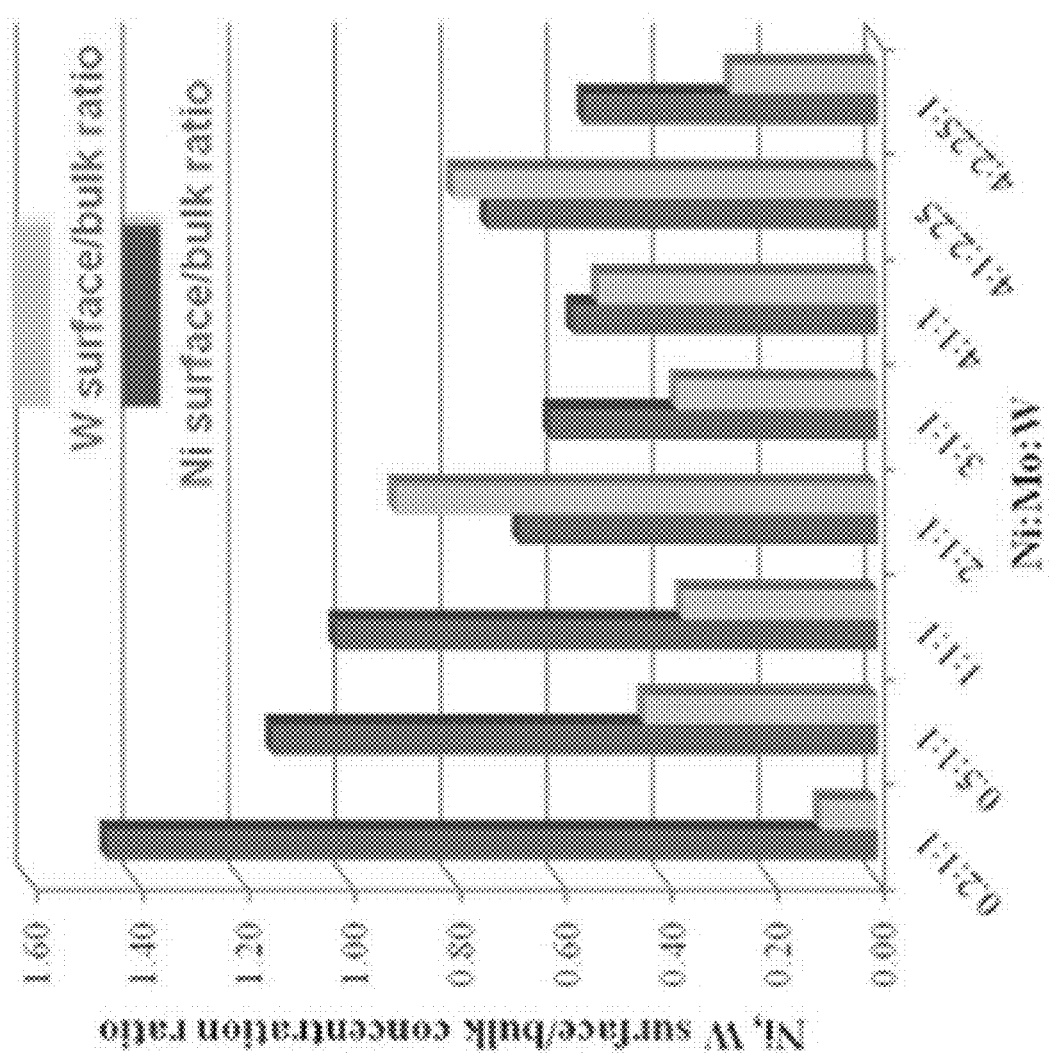
FIG. 11 is a graph showing Ni and W surface concentrations as determined by XPS for different catalysts.

FIG. 11 is a graph comparing the ratio of Ni, W surface to bulk concentration at different nickel, molybdenum and tungsten compositions.

Example 22

Freshly prepared catalysts and spent catalysts were examined and analysed using the BET method. BET surface areas and pore volumes of freshly prepared catalysts and spent catalysts (after hydrotreating Heavy Coker Gas Oil) were measured after a standard pretreatment at 350° C. in $N_2$ for 12 hr.

Figure 12:
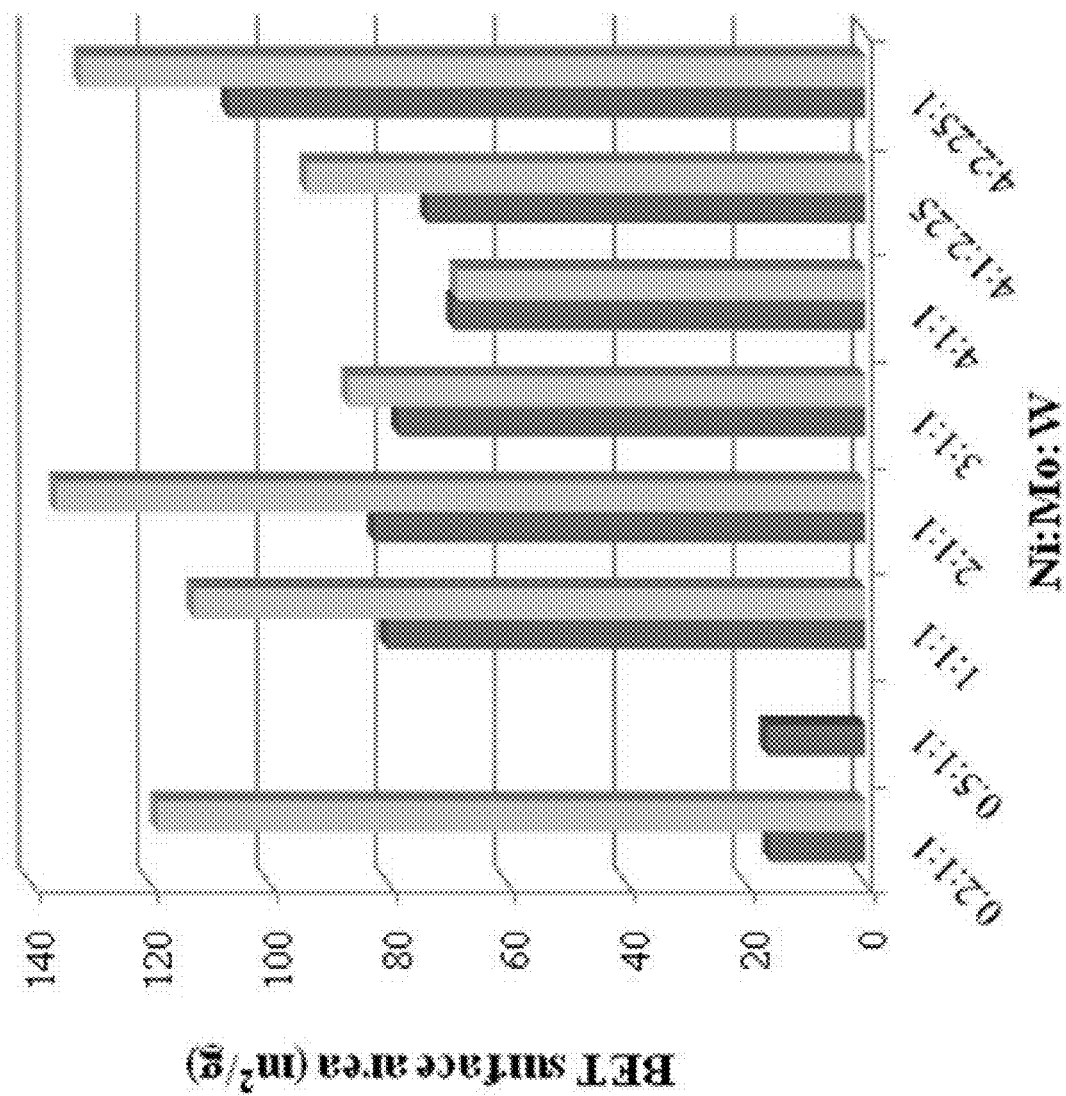
FIG. 12 is a graph showing BET surface areas of freshly prepared and spent catalysts (after hydrotreating of coker gas oil feed).
Figure 13:
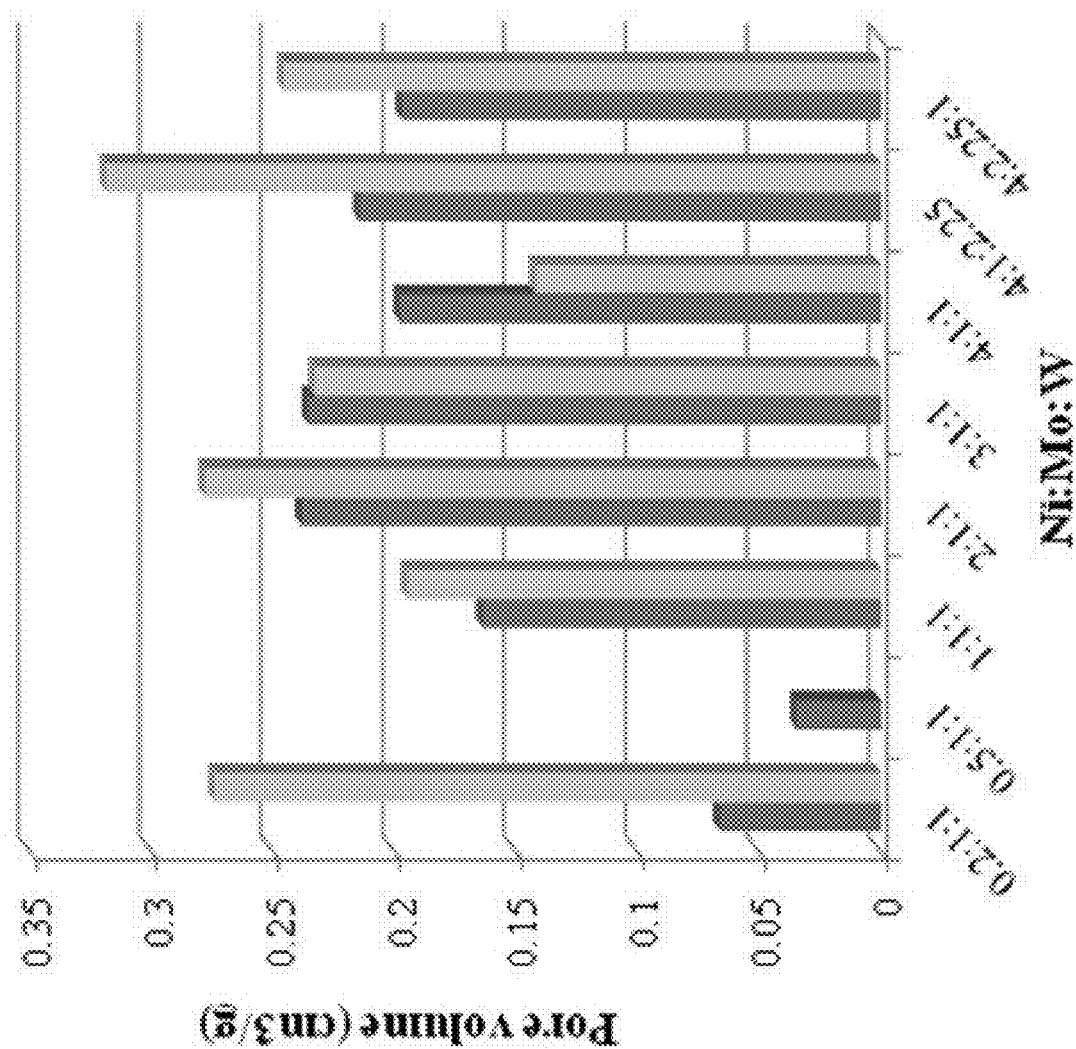
FIG. 13 is a graph comparing pore volumes of freshly prepared and spent catalysts (after hydrotreating of coker gas oil feed for at least 0.5 hr).

FIG. 12 is a graph comparing the BET surface areas of freshly prepared catalysts and spent catalysts (after hydrotreating Heavy Coker Gas Oil feed) at varying transition metal compositions. FIG. 13 is a graph comparing the pore volumes of freshly prepared catalysts and spent catalysts (after hydrotreating Heavy Coker Gas Oil feed) at varying transition metal compositions. For the catalysts having a transition metal composition outside the optimal range, e.g., 10 mol-% Ni, 45 mol-% Mo and 45 mol-% W, the BET surface area decreased almost an order of magnitude indicating severe surface reconstruction. For catalysts having higher Ni:Mo:W molar ratios, e.g., above 1:1:1, the surface area reduction was noticeably smaller.

Figure 14:
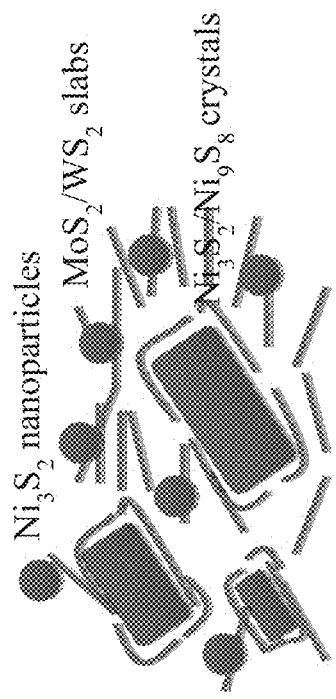
FIG. 14 is a pictorial representation of a surface structure of a self-supported catalyst in the optimum compositional range consisting of 50 mol-% Ni, 25 mol-% Mo and 25 mol-% W.
Figure 15:
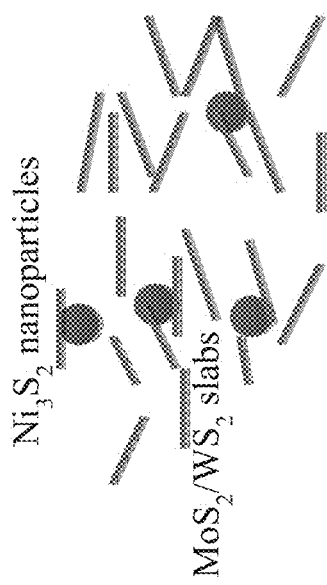
FIG. 15 is a pictorial representation of surface structure of a comparative self-supported catalyst outside the optimum compositional range with 10 mol-% Ni, 45 mol-% Mo and 45 mol-% W.

FIGS. 14 and 15 are representative schemes illustrating the surface structure of a catalyst having a nickel, molybdenum and tungsten composition within the optimal range (e.g., 50 mol-% Ni, 25 mol-% Mo and 25 mol-% W (on a transition metal basis), and outside the optimal range (e.g., 10 mol-% Ni, 45 mol-% Mo and 45 mol-% W (on a transition metal basis), respectively.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A process for making a self-supported mixed metal sulfide (MMS) catalyst comprising molybdenum sulfide, nickel sulfide, and tungsten sulfide, the process comprising:
   mixing a sufficient amount of a nickel (Ni) metal precursor, a sufficient amount of a molybdenum (Mo) metal precursor, and a sufficient amount of a tungsten (W) metal precursor to produce a catalyst precursor having a molar ratio of metal components Ni:Mo:W in relative proportions defined by a region of a ternary phase diagram showing transition metal elemental composition in terms of nickel, molybdenum, and tungsten mol-%, wherein the region is defined by five points ABCDE and wherein the five points are: A in which Ni=0.72, Mo=0.00, W=0.28; B in which Ni=0.55, Mo=0.00, W=0.45; C in which Ni=0.48, Mo=0.14, W=0.38; D in which Ni=0.48, Mo=0.20, W=0.33; and E in which Ni=0.62, Mo=0.14, W=0.24; and
   sulfiding the catalyst precursor under conditions sufficient to convert the catalyst precursor into a sulfide catalyst.

2. The process of claim 1, wherein the amounts of a Ni metal precursor, a Mo metal precursor, and a W metal precursor are sufficient for the catalyst precursor to have a molar ratio of metal components Ni:Mo:W in a range of: $0.33 \leq Ni/(Mo+W) \leq 2.57$, a range of $Mo/(Ni+W)$ molar ratios of $0.00 \leq Mo/(Ni+W) \leq 0.33$, and a range of $W/(Ni+Mo)$ molar ratios of $0.18 \leq W/(Ni+Mo) \leq 3.00$.

3. The process of claim 1, wherein the amounts of a Ni metal precursor, a Mo metal precursor, and a W metal precursor are sufficient for the catalyst to have a molar ratio of metal components Ni:Mo:W in a range of:
   $1.08 <= Ni/(Mo+W) <= 2.03$;
   $0 <= Mo/(Ni+W) <= 0.18$; and
   $0.33 <= W/(Mo+Ni) <= 0.72$.

4. The process of claim 1, further comprising:
   calcining the catalyst precursor to a temperature of at least 300° C. prior to sulfiding the catalyst precursor.

5. The process of claim 1, further comprising:
   heating the catalyst precursor to a temperature of at least 150° C. prior to sulfiding the catalyst precursor.

6. The process of claim 1, wherein after sulfiding, the catalyst has a BET surface area of at least 20 $m^2/g$ and a pore volume of at least 0.05 $cm^3/g$.

7. The process of claim 1, wherein after sulfiding, the catalyst has a BET surface area of at least 40 $m^2/g$ and a pore volume of at least 0.05 $cm^3/g$.

8. The process of claim 1, wherein after sulfiding, the catalyst has a Ni surface concentration/Ni bulk concentration ratio of greater than 0.4 as characterized by XPS.

9. The process of claim 1, wherein after sulfiding, the catalyst has a Ni surface concentration/Ni bulk concentration ratio of greater than 0.5 as characterized by XPS.

10. The process of claim 1, wherein after sulfiding, the catalyst has a W surface concentration/W bulk concentration ratio of greater than 0.3 as characterized by XPS.

11. The process of claim 10, wherein after sulfiding, the catalyst has a W surface concentration/W bulk concentration ratio of greater than 0.4 as characterized by XPS.

12. The process of claim 1, wherein after sulfiding, the catalyst shows a multi-phased structure comprising five phases: a molybdenum sulfide phase, a tungsten sulfide phase, a molybdenum tungsten sulfide phase, an active nickel phase, and a nickel sulfide phase.

13. The process of claim 12, wherein the molybdenum tungsten sulfide phase comprises at least a layer and wherein the at least a layer contains at least one of: a) molybdenum sulfide and tungsten sulfide; b) tungsten isomorphously substituted into molybdenum sulfide as individual atoms or as tungsten sulfide domains; c) molybdenum isomorphously substituted into tungsten sulfide as individual atoms or as molybdenum sulfide domains; and d) mixtures thereof.

14. The process of claim 12, wherein the active nickel phase comprises at least one of atomic nickel and reduced nickel substituted into edge of the molybdenum tungsten sulfide phase.

15. The process of claim 12, wherein the active nickel phase comprises $NiS_x$ nanoparticles dispersed onto the molybdenum tungsten sulfide phase or edge of the molybdenum tungsten sulfide phase.

16. The process of claim 12, wherein the nickel sulfide phase comprises slabs of $Ni_9S_8$ and $Ni_3S_2$ layers.

17. The process of claim 1, wherein the molybdenum metal precursor is selected from molybdenum metal, alkali metal molybdates, ammonium metallates of molybdenum, molybdenum sulphate, molybdenum phosphate, molybdenum silicate, molybdenum borate, molybdenum naphthenate, pentacyclodienyl molybdate, cyclopentadienyl Mo tricarbonyl dimer, ammonium salts of phosphomolybdic acids, phosphomolybdic acid, molybdenum oxide, Mo—P heteropolyanion compounds, Mo—Si heteropolyanion compounds, inorganic metal sulfides of molybdenum, sulfur-containing inorganic compounds of molybdenum, sulfur-containing organic compounds of molybdenum, and mixtures thereof.

18. The process of claim 1, wherein the tungsten metal precursor is selected from alkali metal tungstates, ammonium metallates of tungsten, inorganic tungsten compounds, tungsten naphthenate, pentacyclodienyl tungsten dihydride, tungsten oxide, W—P heteropolyanion compounds, W—Si heteropolyanion compounds, sulfur-containing inorganic compounds of tungsten, sulfur-containing organic compounds of tungsten, and mixtures thereof.

19. The process of claim 1, wherein the nickel metal precursor is selected from inorganic metal sulfides of nickel, sulfur-containing inorganic compounds of nickel, sulfur-containing organic compounds of nickel, nickel carbonate, nickel hydroxide, nickel phosphate, nickel phosphite, nickel formate, nickel fumarate, nickel molybdate, nickel tungstate, nickel oxide, nickel alloys, cyclopentadienyl nickel, nickel naphthenate, and mixtures thereof.

* * * * *